(12) United States Patent
Mukawa et al.

(10) Patent No.: US 7,042,637 B2
(45) Date of Patent: May 9, 2006

(54) IMAGE DISPLAY

(75) Inventors: Hiroshi Mukawa, Kanagawa (JP); Yoshinori Tanaka, Kanagawa (JP)

(73) Assignee: Sony Corproation, Tokyo (JP)

( * ) Notice: Subject to any disclaimer, the term of this patent is extended or adjusted under 35 U.S.C. 154(b) by 78 days.

(21) Appl. No.: 10/489,872

(22) PCT Filed: Oct. 15, 2002

(86) PCT No.: PCT/JP02/10667

§ 371 (c)(1),
(2), (4) Date: Mar. 17, 2004

(87) PCT Pub. No.: WO03/034144

PCT Pub. Date: Apr. 24, 2003

(65) Prior Publication Data

US 2004/0246225 A1    Dec. 9, 2004

(30) Foreign Application Priority Data

Oct. 15, 2001    (JP)  ............................ 2001-317314

(51) Int. Cl.
*G02B 5/20* (2006.01)
*G02B 27/10* (2006.01)
*G03B 21/00* (2006.01)
*H04N 5/74* (2006.01)
*G02F 1/1335* (2006.01)

(52) U.S. Cl. ...................... 359/359; 359/618; 359/619; 359/634; 359/15; 353/31; 353/37; 353/34; 353/84; 348/742; 348/751; 348/766; 349/5; 349/86; 345/102

(58) Field of Classification Search ................ 359/359, 359/618, 619, 634, 636, 15, 621, 622; 353/31, 353/34, 37, 94, 84, 122; 348/742, 744, 751, 348/757, 766; 349/5, 86, 106, 115; 345/102
See application file for complete search history.

(56) References Cited

U.S. PATENT DOCUMENTS

| | | | | |
|---|---|---|---|---|
| 5,115,305 | A * | 5/1992 | Baur et al. | 348/751 |
| 5,221,982 | A * | 6/1993 | Faris | 349/115 |
| 5,231,432 | A * | 7/1993 | Glenn | 353/31 |
| 5,394,204 | A | 2/1995 | Shigeta et al. | 353/31 |
| 5,469,278 | A * | 11/1995 | Takahara et al. | 349/86 |
| 5,548,349 | A * | 8/1996 | Mizuguchi et al. | 348/766 |
| 5,760,850 | A * | 6/1998 | Nakanishi et al. | 349/5 |
| 6,330,112 | B1 * | 12/2001 | Kaise et al. | 359/621 |
| 6,478,430 | B1 * | 11/2002 | Wada | 353/31 |
| 6,493,149 | B1 * | 12/2002 | Ouchi | 359/634 |
| 6,588,906 | B1 * | 7/2003 | Hwang | 353/31 |
| 6,765,705 | B1 * | 7/2004 | Ouchi | 359/216 |
| 6,816,290 | B1 * | 11/2004 | Mukawa | 359/15 |

FOREIGN PATENT DOCUMENTS

JP        06-067140      3/1994

(Continued)

*Primary Examiner*—Loha Ben
(74) *Attorney, Agent, or Firm*—Sonnenschein, Nath & Rosenthal LLP

(57) ABSTRACT

This invention is an image display device for performing color display of an image using two spatial light modulators. The image display device has a first spatial light modulator (52) for modulating a first wavelength range component of illuminating light from an illuminating light source (10), dichroic mirrors (40), (41) for separating second and third wavelength range components of the illuminating light and condensing the respective wavelength range components, a second spatial light modulator (50) for modulating the second and third wavelength range components, and a dichroic mirror (60) for combining modulated light emitted from the first and second spatial light modulators (52), (50).

27 Claims, 17 Drawing Sheets

FOREIGN PATENT DOCUMENTS

| | | |
|---|---|---|
| JP | 07-077689 | 3/1995 |
| JP | 2000-147656 | 5/2000 |
| JP | 2000-347323 | 12/2000 |
| JP | 2001-013492 | 1/2001 |
| JP | 2001-194737 | 7/2001 |

* cited by examiner

IMAGE DISPLAY

BACKGROUND OF THE INVENTION

This invention relates to an image display device, and particularly to a projection-type image display device and a virtual image display device.

BACKGROUND ART

Conventionally, with respect to an image display device such as a projection-type image display device or a virtual image display device using a spatial light modulator, the following proposals have been in order to realize color image display.

(1) One spatial light modulator is used and pixels for R (red), G (green) and B (blue), respectively, are spatially arranged in the spatial light modulator. Color image display is realized by using at least these three basic color pixels as a set and making each color pixel smaller than a size that can be recognized with the spatial resolution of human eyes.

Systems for this include a system in which a color filter is provided for each pixel, a color filterless system using a dichroic mirror and a microlens array, for example, as described in JP-A-4-60538, and a color filterless system using a holographic optical element, for example, as described in JP-A@-189809.

(2) In a "field sequential color system" where one spatial light modulator is used and three colors R (red), G (green) and B (blue) of illuminating light illuminating the element is time-divisionally switched, color image display is realized by at least shortening the switching time to less than a time that can be recognized with the temporal resolution of human eyes. A fundamental difference between this system and the first system is that the spatial light modulator constantly modulates only one of R (red), G (green) and B (blue) at arbitrary timing over the entire display area. As the element for time-divisionally switching the color components, for example, "Time Sequential System" manufactured by Color Link may be used.

(3) Color image display is realized by using three spatial light modulators for R (red), G (green) and B (blue), respectively, and causing color combination means to combine images of the respective colors emitted from these spatial light modulators, for example, as described in JP-A-6-202004.

(4) Color image display is realized by combining the second system with the third system, that is, by using a first spatial light modulator that constantly modulates only one of R (red), G (green) and B (blue) at arbitrary timing and a second spatial light modulator that modulates the remaining two colors in the "field sequential color system". Modulated light from the first spatial light modulator and modulated light from the second spatial light modulator are combined by color combination means.

In the image display device as described above, in the first system, a color image is formed by at least three basic color pixels of R (red), G (green) and B (blue) as a set. Therefore, for the same display area, the number of color pixels that can be displayed is ⅓ of that in the second system. If the number of color pixels that can be displayed is made equal to that in the second system, the area of the spatial light modulator becomes three times that in the second system and the device is increased in size.

In the second system, if the response speed of the element for time-divisionally switching three colors R (red), G (green) and B (blue) is not sufficiently high, light beams of the respective colors R, G and B appear independently and a displayed image cannot be recognized as a color image. That is, a problem of so-called color breakup occurs.

As a switching frequency that sufficiently conceals color breakup, 360 Hz or higher is necessary. Therefore, the response speed of the switching element must be approximately 1 msec.

Also for the illuminating light illuminating the spatial light modulator, the respective basic colors must be switched at a high speed. This means that if an illuminating light source for emitting light simultaneously over all the range such as a lamp light source is used, only a part of emission spectrum of the light source can be effectively used at arbitrary timing and therefore the light utilization efficiency is significantly deteriorated.

In the third system, though the problems of the above-described first and second system do not occur, there are problems such as increase in the cost of components of the spatial light modulators due to the use of the three spatial light modulators, complexity of adjustment for alignment of relative positions of the three spatial light modulators, increase in the cost of components of the color combination system for the three colors, and increase in the size of the device. There is also a problem of poor reliability in positional deviation of the spatial light modulators with respect to each other. Moreover, in the case where the device is constructed as a projection-type image display device, there is a problem of increase in F-number of a projection optical system due to increase of back focusing to the projection optical system. This leads to increase in the size of the projection optical system and increase in the manufacturing cost.

The fourth system solves the problems of the third system and has the following advantages, compared with the third system: a smaller number of spatial light modulators can be used; the number of adjustment steps is reduced; a color combination system for two colors is enough; the device is miniaturized; and reliability in positional deviation of the spatial light modulator is improved.

However, it cannot solve the problems of the second system, that is, the occurrence of color breakup in the case the response speed of the color switching element is not sufficiently high and lowering of the light utilization efficiency due to the employment of the "field sequential system", and the problems due to the need to switch the color of illuminating light.

SUMMARY OF THE INVENTION

It is an object of this invention to provide a new image display device that can solve the problems in realizing color image display by the conventional image display device.

It is another object of this invention to provide an image display device that can be miniaturized and enables easy adjustment during the manufacturing process.

It is still another object of this invention to provide an image display device in which the problems of the spatial light modulator and the problems due to color switching of illuminating light do not occur.

In order to achieve the above-described objects, an image display device according to this invention includes: an illuminating light source for emitting illuminating light; a first spatial light modulator on which a first wavelength range component of the illuminating light becomes incident and which modulates the first wavelength range component in accordance with a pixel corresponding to the first wavelength range component; color separation and condensation means being a holographic optical element for separating second and third wavelength range components different from the first wavelength range of the illuminating light and condensing the respective wavelength range components; a second spatial light modulator on which the second and third wavelength range components are condensed and made incident at different pixel positions corresponding to the second and third wavelength range components by the color separation and condensation means and which modulates these respective wavelength range components in accordance with pixels corresponding to the respective wavelength range components; and color combination means for combining modulates light emitted from the first and second spatial light modulators.

Another image display device according to this invention includes: an illuminating light source for emitting illuminating light; a time division color filter on which the illuminating light becomes incident and which sequentially and alternately transmits two different wavelength range components of the illuminating light; color separation and condensation means for condensing one wavelength range component transmitted through the time division color filter as a first wavelength range component, and for separating the other wavelength range component transmitted through the time division color filter into second and third wavelength range components and condensing the respective wavelength range components; and spatial light modulators for modulating the first wavelength range component in accordance with a pixel corresponding to the first wavelength range component when the first wavelength range component is made incident thereon by the color separation and condensation means, and for modulating the second and third wavelength range components in accordance with pixels corresponding to these respective wavelength range components when these respective wavelength range components are condensed and made incident at different pixel positions corresponding to the second and third wavelength range components.

This invention provides an image display device having the advantages of the above-described conventional first system combined with those of the second system, or having the advantages of the first system combined with those of the fourth system.

In the image display device according to this invention, since it is not necessary to use three spatial light modulators, the problems of the above-described third system are solved.

According to this invention, by combining the advantages of the first and second systems, it is possible to display a color image with one spatial light modulator and to solve the problem of the first system, that is, low definition, and the problems of the second system, that is, color breakup and low light utilization efficiency.

In the image display device according to this invention, since one color image is formed physically by two basic color pixels, the definition can be improved. As the spatial light modulator only needs to perform two-color time-division switching display, the response speed required of the spatial light modulator is reduced. Therefore, the color breakup phenomenon can be relaxed and the light utilization efficiency can be improved.

According to this invention, by combining the advantages of the first and fourth system, it is possible to display a color image with two spatial light modulators. As the spatial light modulators, which time-divisionally modulates illuminating light of two colors in the fourth system, are spatially arranged on two basic color pixels as in the first system, the problems such as color breakup and lowering of light utilization efficiency due to employment of the "field sequential system", and the problems due to the need to switch the color of the illuminating light can be solved.

The other objects of this invention and specific advantages provided by this invention will be further clarified by the following description of embodiments described with reference to the drawings.

DETAILED DESCRIPTION OF THE PRESENTLY PREFERRED EMBODIMENTS

Hereinafter, embodiments of this invention will be described in detail with reference to the drawings.

First Embodiment

As a first embodiment of an image display device according to this invention, an example in which this invention is applied to a two-plate projection-type image display device will be described.

Figure 1:
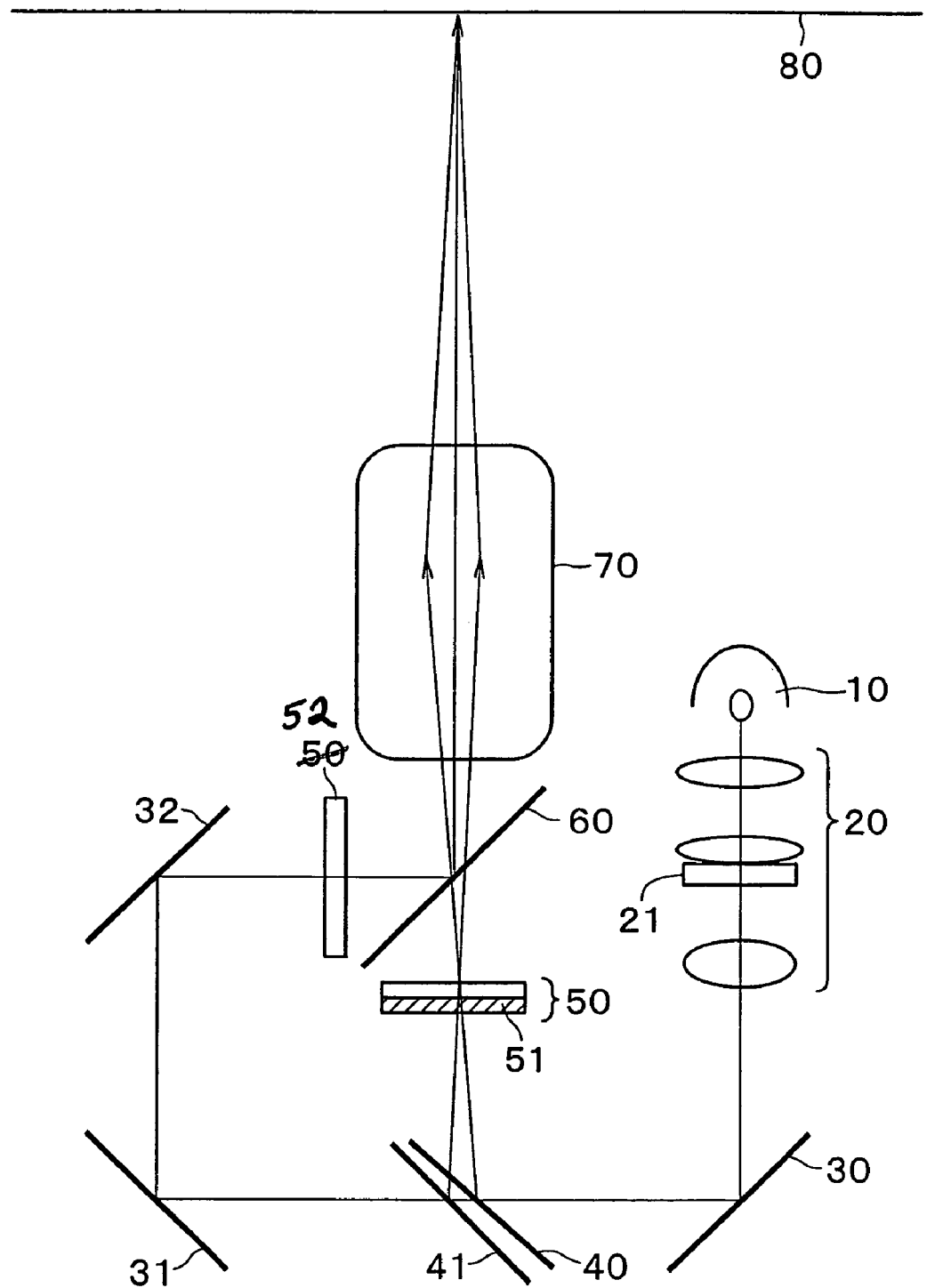
FIG. 1 is a plan view showing a first embodiment of an image display device according to this invention.

The two-plate projection-type image display device has transmission liquid crystal elements 50, 52 as spatial light modulators, a dichroic mirror 60 as color combination means, dichroic mirrors 40, 41 as color separation means to the two transmission liquid crystal elements 50, 52, and the dichroic mirrors 40, 41 and a microlens array 51 as color separation and condensation means to the one transmission liquid crystal element, as shown in FIG. 1.

In the two-plate projection-type image display device, illuminating light emitted from a UHP lamp light source 10 as an illuminating light source becomes incident on an illuminating optical system 20 having functions such as correction of the cross-sectional shape of luminous flux, equalization of intensity, and control of divergence angle.

The illuminating optical system 20 has polarization conversion means 21 called P-S polarization converter having a function of uniformly converting unpolarized luminous fluxes to either P-polarized light or S-polarized light at an efficiency of 50% or higher. This illuminating optical system 20 includes plural condenser lenses and the polarization conversion means 21.

In this image display device, the illuminating light passed through the illuminating optical system 20 has been converted to polarized light with its electrical vector oscillating mainly in a direction perpendicular to the face of FIG. 1, that is, to S-polarized light to a mirror 30 on which the light becomes incident after it becomes incident on the illuminating optical system 20.

Of the illuminating light reflected and polarized by the mirror 30, only a blue light component (second wavelength range component) is reflected mainly by the dichroic mirror 40 for blue reflection, which constitutes the color separation and condensation means. Then, only a green light component (third wavelength range component) is reflected mainly by the dichroic mirror 41 for green reflection, which constitutes the arranged color separation and condensation means. These green light component and blue light component become incident on the blue/green transmission liquid crystal element 50, which is a second spatial light modulator having color pixels for green light modulation and color pixels for blue light modulation. The dichroic mirror 40 for blue reflection and the dichroic mirror 41 for green reflection are arranged in such a manner that the incident angles on the blue/green transmission liquid crystal element 50 of the reflected light beams of from these dichroic mirrors are inclined by an equal angle to the vertical direction of this element from the opposite sides.

Figure 2:
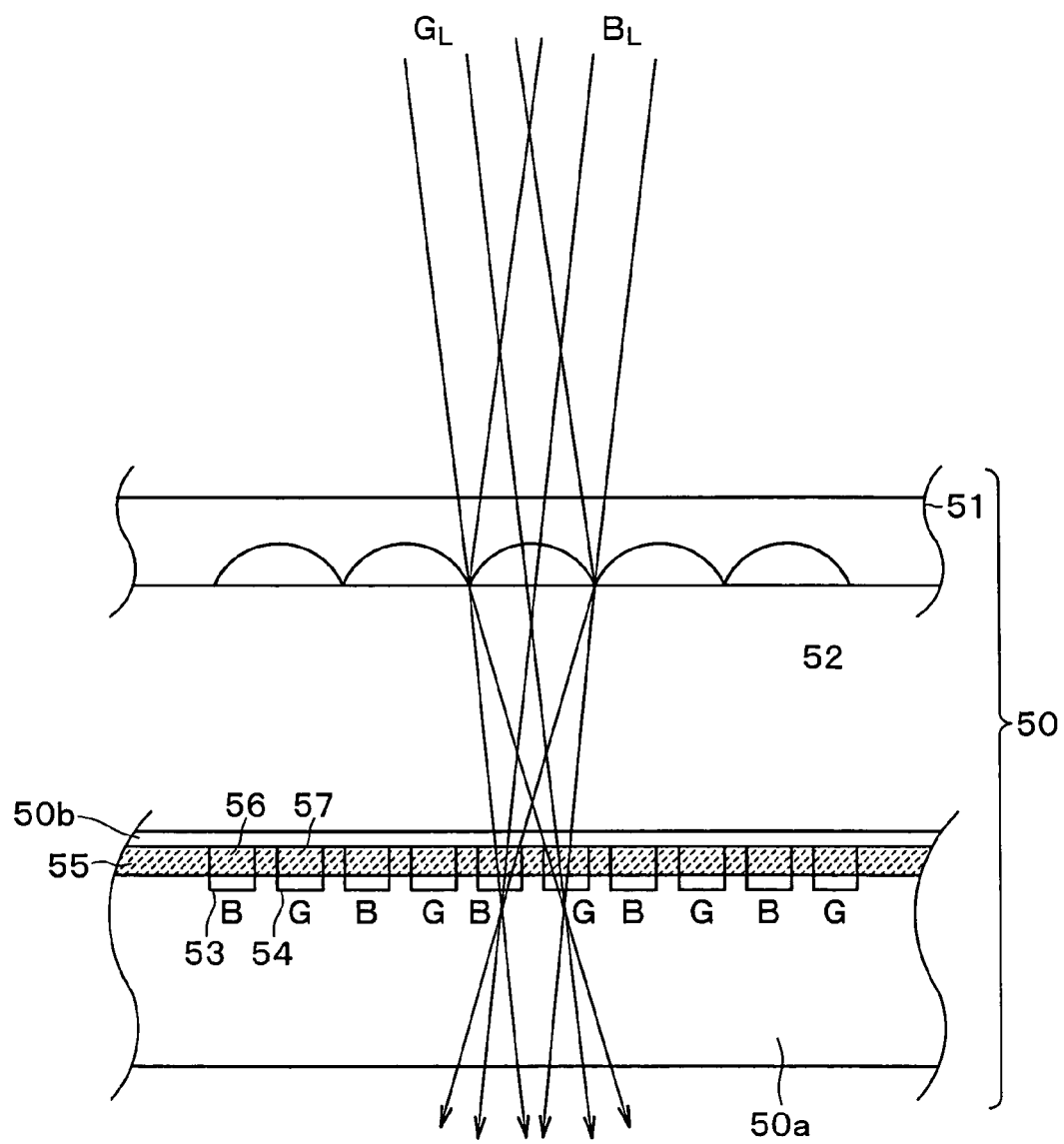
FIG. 2 is a longitudinal sectional view showing a lens array constituting the image display device.

On the incident side of the blue/green transmission liquid crystal element 50, the microlens array 51 constituting the color separation and condensation means is provided. The microlens array 51 is formed on a glass board 58. By the microlens array 51, blue light $B_L$ and green light $G_L$ to be incident on the blue/green transmission liquid crystal element 50 are condensed and made incident on the blue/green transmission liquid crystal element 50, corresponding to a blue color pixel 56 and a green color pixel 57, respectively, as shown in FIG. 2. The blue color pixel 56 and the green color pixel 57 are provided corresponding to a blue color pixel electrode 53 and a green color pixel electrode 54 in a liquid crystal layer 55 of the blue/green transmission liquid crystal element 50. The transmission liquid crystal element 50 is formed by a glass board 50*a*, and a common transparent electrode 50*b* is provided on the surface of each pixel.

The S-polarized light incident on the blue/green transmission liquid crystal element 50 has its intensity modulated in accordance with the pixels 56, 57 and is emitted as P-polarized light toward the dichroic mirror 60 as color combination means, which is a color combination mirror having a dielectric multilayer film, as shown in FIG. 1.

On the other hand, a red light component (first wavelength range component) transmitted through the dichroic mirror 40 for blue reflection and the dichroic mirror 41 for green reflection is reflected by mirrors 31, 32 and then becomes incident on the red transmission liquid crystal element (first light modulator) 52. In this red transmission liquid crystal element 52, the red light component of the illuminating light has its intensity modulated and is emitted as S-polarized light toward the dichroic mirror 60.

The illuminating light (modulated light) modulated and emitted by the blue/green transmission liquid crystal element 50 and the illuminating light (modulated light) modulated and emitted by the red transmission liquid crystal element 52 are color-combined by the dichroic mirror 60 for red reflection and emitted toward a projection optical system 70. By the projection optical system 70, this illuminating light is caused to form an image on a screen 80. A color image is displayed on this screen 80.

Figure 3:
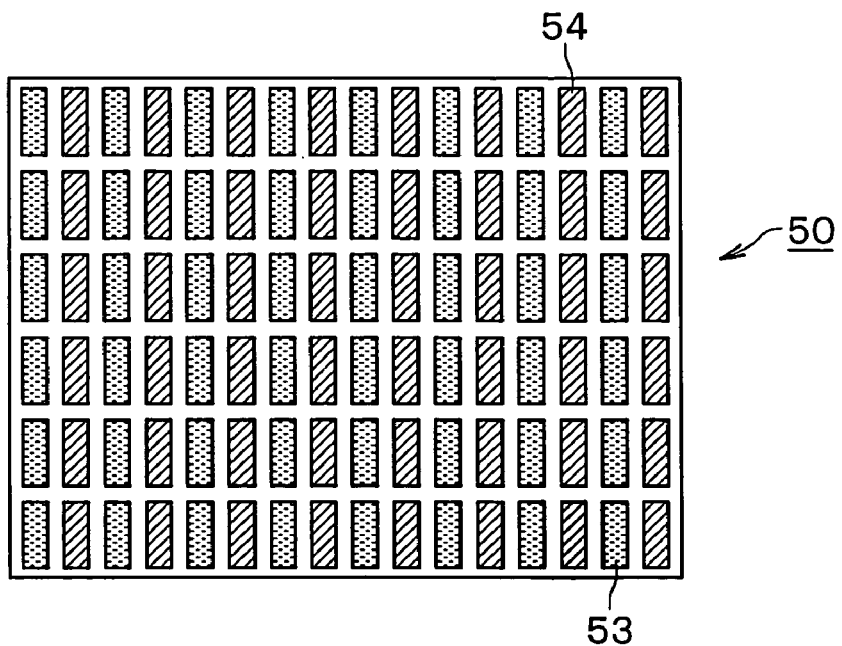
FIG. 3 is a plan view showing the structure of a blue/green spatial light modulator of the image display device.
Figure 4:
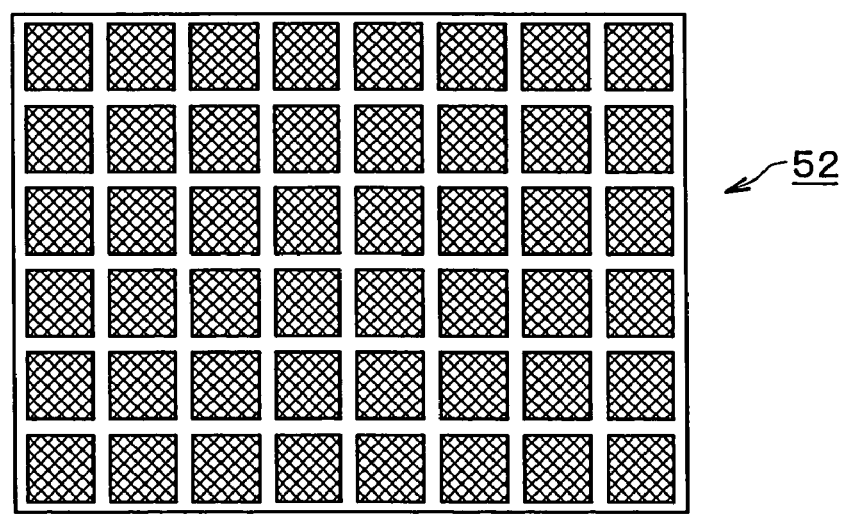
FIG. 4 is a plan view showing the structure of a red spatial light modulator of the image display device.

In this image display device, as shown in FIG. 3, the blue/green transmission liquid crystal element 50 has a pixel structure such that the basic pixel pitch in the direction of arrow X is ½ of the basic pixel pitch in the pixel structure of the red transmission liquid crystal element 52 shown in FIG. 4 and each pixel area is approximately half the pixel area in the pixel structure of the red transmission liquid crystal element 52.

The thickness of the liquid crystal layer of the blue/green transmission liquid crystal element 50 and the thickness of the liquid crystal layer of the red transmission liquid crystal element 52 are optimized in accordance with the difference of color light to be modulated.

Second Embodiment

As a second embodiment of the image display device according to this invention, an example in which this invention is applied to a two-plate projection-type image display device will be described.

Figure 5:
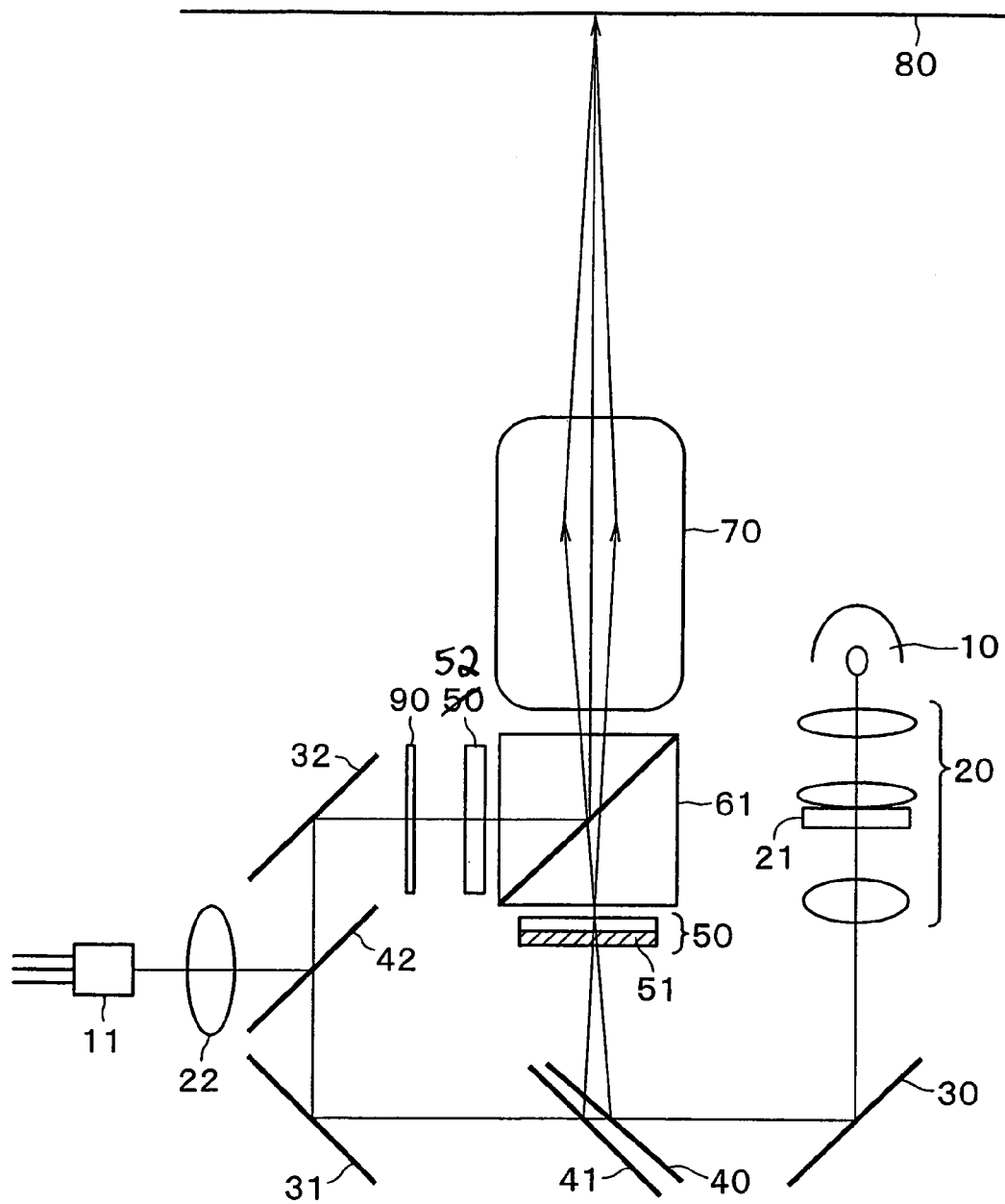
FIG. 5 is a plan view showing a second embodiment of the image display device according to this invention.

The two-plate projection-type image display device in the second embodiment has transmission liquid crystal elements 50, 52 as spatial light modulators, a polarized light beam splitter 61 as color combination means, dichroic mirrors 40, 41 as color separation means for the two transmission liquid crystal elements 50, 52, and the dichroic mirrors 40, 41 and a microlens array 51 as color separation and condensation means to the one transmission liquid crystal element 50, as shown in FIG. 5.

First, illuminating light emitted from a UHP lamp light source 10 constituting an illuminating light source together with a red LED light source 11, which will be described later, becomes incident on an illuminating optical system 20 having functions such as correction of the cross-sectional shape of luminous flux, equalization of intensity, and control of divergence angle.

The illuminating optical system 20 has polarization conversion means 21 called P-S polarization converter having a function of uniformly converting unpolarized luminous fluxes to either P-polarized light or S-polarized light at an efficiency of 50% or higher. This illuminating optical system 20 includes plural condenser lenses and the polarization conversion means 21.

In this image display device, the illuminating light passed through the illuminating optical system 20 has been converted to polarized light with its electrical vector oscillating mainly in a direction perpendicular to the face of FIG. 5, that is, to S-polarized light to a mirror 30 on which the light becomes incident after it becomes incident on the illuminating optical system 20.

Of the illuminating light reflected and polarized by the mirror 30, only a blue light component (second wavelength range component) is reflected mainly by the dichroic mirror 40 for blue reflection, which constitutes the color separation and condensation means. Then, only a green light component (third wavelength range component) is reflected mainly by the dichroic mirror 41 for green reflection, which constitutes the arranged color separation and condensation means. These green light component and blue light component become incident on the blue/green transmission liquid crystal element 50, which a second spatial light modulator having color pixels for green light modulation and color pixels for blue light modulation. The dichroic mirror 40 for blue reflection and the dichroic mirror 41 for green reflection are arranged in such a manner that the incident angles on the blue/green transmission liquid crystal element 50 of the reflected light beams of from these dichroic mirrors are inclined by an equal angle to the vertical direction of this element from the opposite sides.

On the incident side of the blue/green transmission liquid crystal element 50, the microlens array 51 constituting the color separation and condensation means is provided. By the microlens array 51, blue light and green light to be incident on the blue/green transmission liquid crystal element 50 are condensed and made incident on the blue/green transmission liquid crystal element 50, corresponding to a blue color pixel 56 and a green color pixel 57, respectively, as shown in FIG. 2. The blue color pixel 56 and the green color pixel 57 are provided corresponding to a blue color pixel electrode 53 and a green color pixel electrode 54 in a liquid crystal layer 55 of the blue/green transmission liquid crystal element 50.

The S-polarized light incident on the blue/green transmission liquid crystal element 50 has its intensity modulated in accordance with the pixels 56, 57 and is emitted as P-polarized light toward the polarized light beam splitter 61 as color combination means, as shown in FIG. 5.

On the other hand, a red light component (first wavelength range component) transmitted through the dichroic mirror 40 for blue reflection and the dichroic mirror 41 for green reflection is passed through a mirror 31, a reflection holographic optical element 42 for red light reflection, a mirror 32 and a ½ wavelength plate 90, and becomes incident on the red transmission liquid crystal element 52. In this case, the red light component incident on the red transmission liquid crystal element 52 has been converted from S-polarized light to P-polarized light by the ½ wavelength plate 90. Therefore, the light emitted from the red transmission liquid crystal element 52 toward the polarized light beam splitter 61 is S-polarized light.

The reflection holographic optical element 42 arranged in the optical path between the mirror 31 and the mirror 32 has a characteristic of mainly reflecting the spectrum of the red LED light source 11 constituting the illuminating light source and transmitting incident light of the other wavelength ranges. The red light emitted form the red LED light source 11 is passed through a condenser lens 22, and becomes incident on the reflection holographic optical element 42. The red light is reflected by the reflection holographic optical element 42, then passed through the mirror 32 and the ½ wavelength plate 90, and becomes incident on the red transmission liquid crystal element 52.

Figure 6:
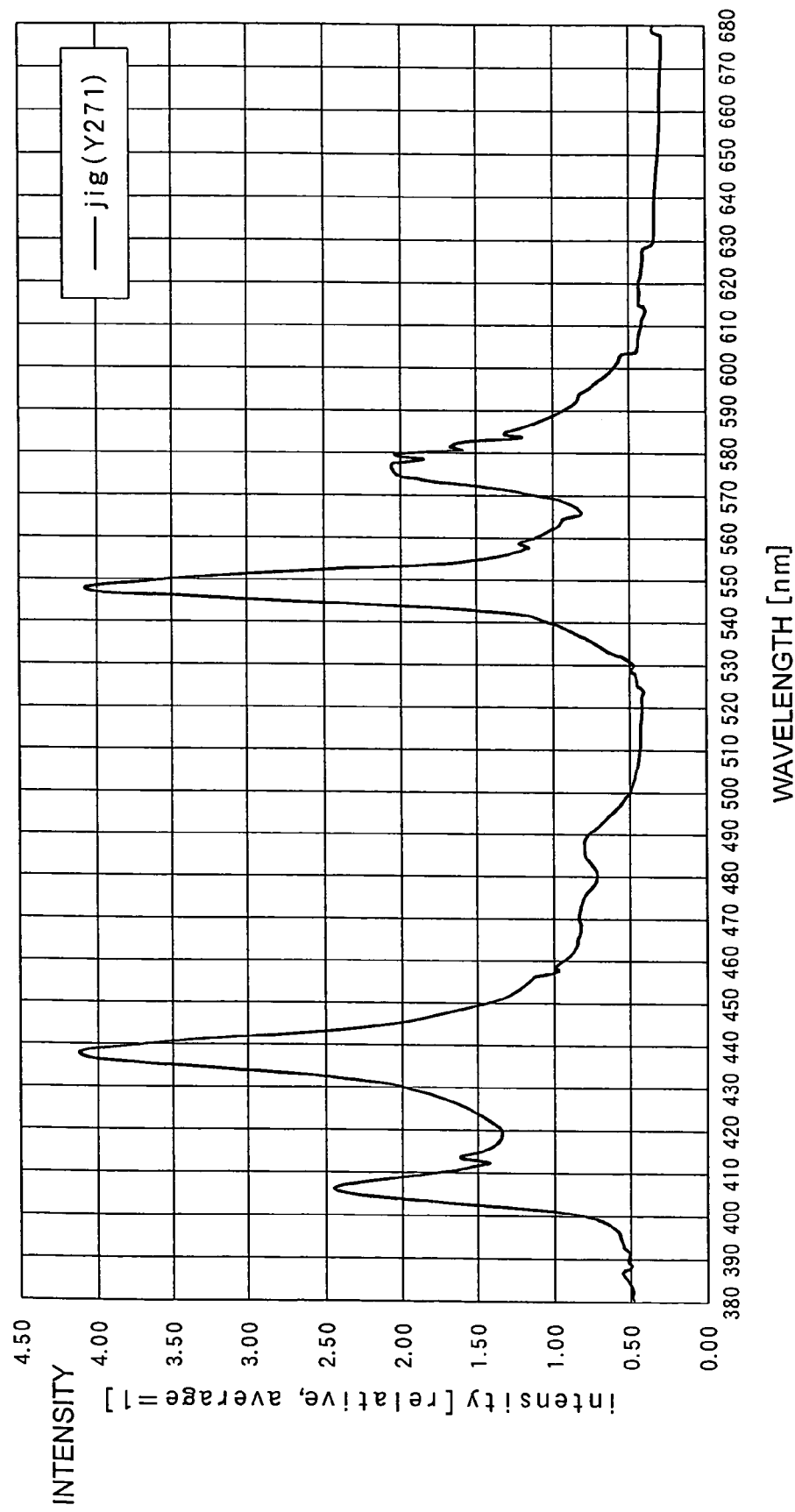
FIG. 6 is a graph showing emission spectrum of a UHP lamp used in the image display device.
Figure 7:
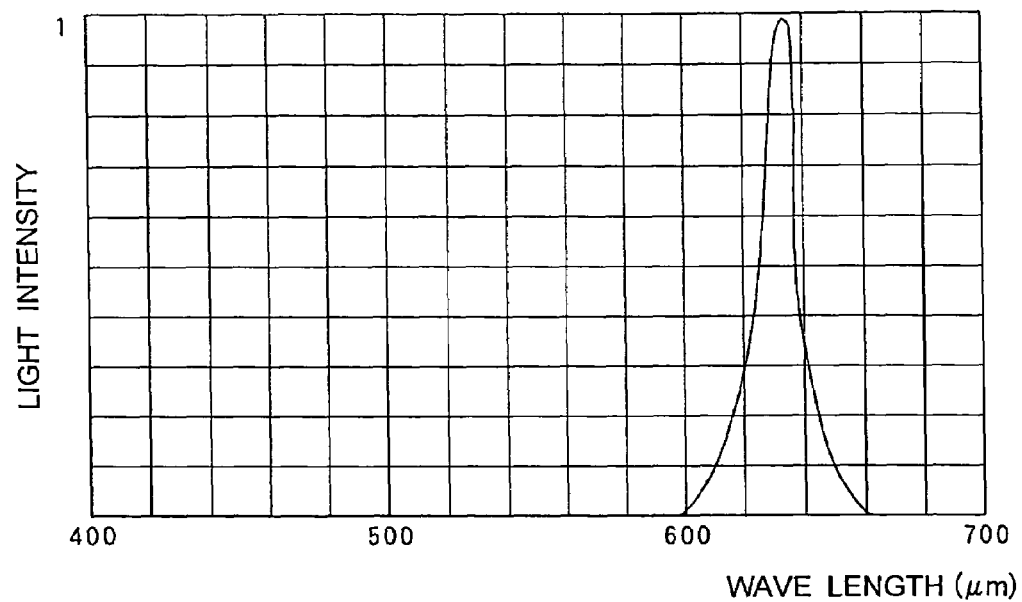
FIG. 7 is a graph showing emission spectrum of an LED lamp used in the image display device.
Figure 8:
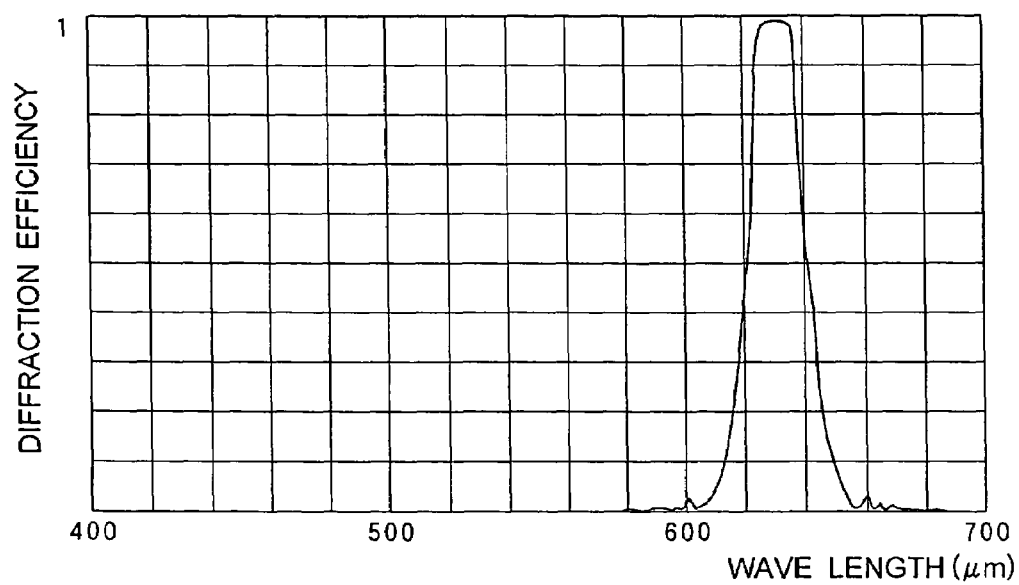
FIG. 8 is a graph showing spectral diffraction efficiency of a holographic optical element used in the image display device.

With respect to the emission spectrum of the UHP lamp light source 10, the luminance of the red wavelength range is lower than the luminance of the blue and green wavelength ranges, as shown in FIG. 6. In this image display device, light of a wavelength range of 630±10 nm is reflected by the reflection holographic optical element 42 and does not reach the red transmission liquid crystal element 52. In this image display device, as shown in FIG. 7, the emission spectrum of the red LED light source 11 corresponds to the wavelength-dependent characteristic of the reflection and diffraction efficiency of the reflection holographic optical element 42 shown in FIG. 8. Therefore, light emitted from the red LED light source 11 is efficiently reflected by the reflection holographic optical element 42 for red light reflection and illuminates the red transmission liquid crystal element 52.

As shown in FIG. 5, the P-polarized light emitted from the blue/green transmission liquid crystal element 50 and the S-polarized light emitted from the red transmission liquid crystal element 52 are color-combined by the polarized light beam splitter 61 and emitted toward a projection optical system 70. By the projection optical system 70, the illuminating light incident on the projection optical system 70 is caused to form an image on a screen 80. A color image is displayed on this screen 80.

In this image display device, as shown in FIG. 3, the blue/green transmission liquid crystal element 50 has a pixel structure such that the basic pixel pitch in the direction of arrow X is ½ of the basic pixel pitch in the pixel structure of the red transmission liquid crystal element 52 shown in FIG. 4 and each pixel area is approximately half the pixel area in the pixel structure of the red transmission liquid crystal element 52.

The thickness of the liquid crystal layer of the blue/green transmission liquid crystal element 50 and the thickness of the liquid crystal layer of the red transmission liquid crystal element 52 are optimized in accordance with the difference of the color light to be modulated.

Third Embodiment

As a third embodiment of the image display device according to this invention, an example in which this invention is applied to a two-plate projection-type image display device will be described.

Figure 9:
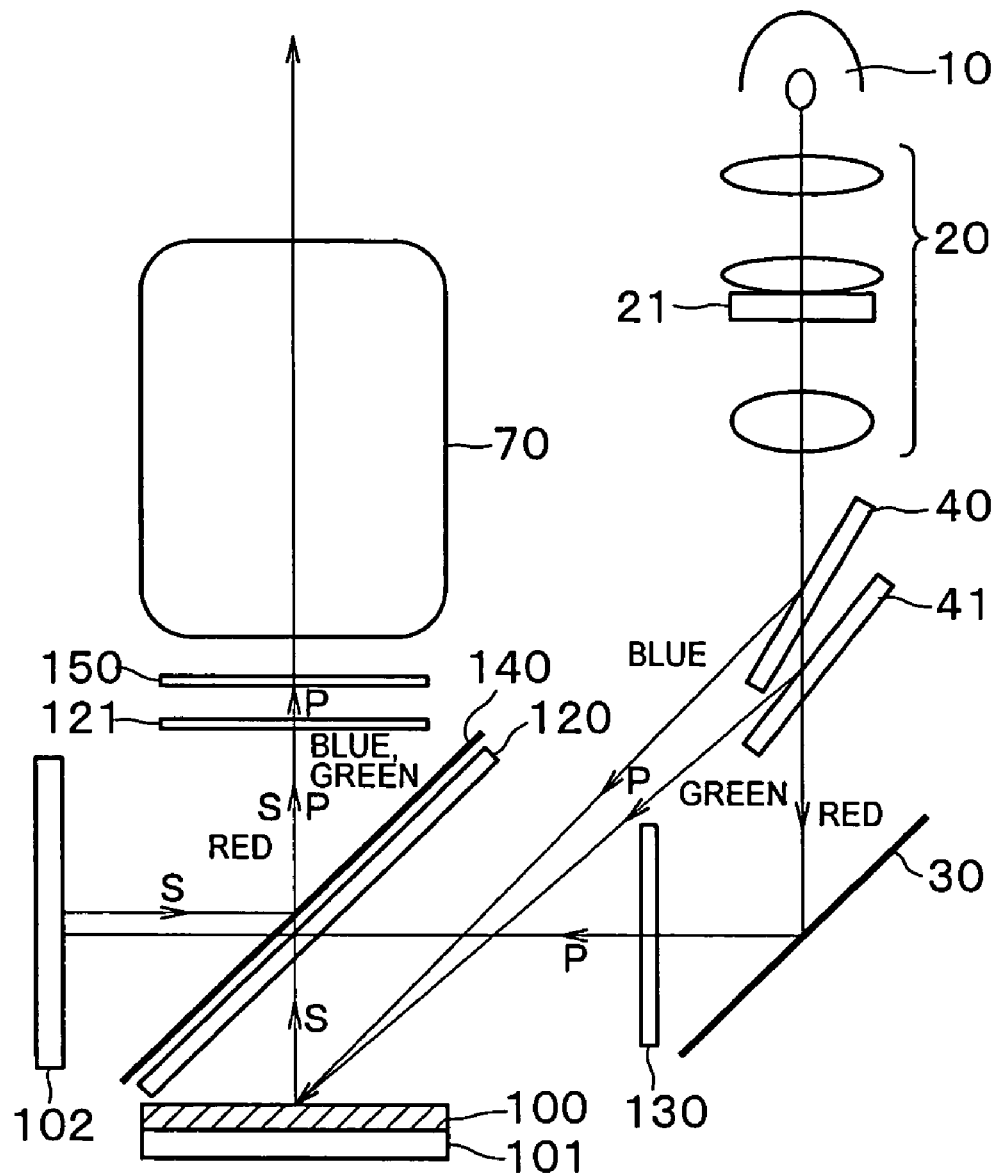
FIG. 9 is a plan view showing a third embodiment of the image display device according to this invention.

The two-plate projection-type image display device in the third embodiment has reflection liquid crystal spatial light modulators 101, 102 as spatial light modulators, a polarized light beam splitter 140 and specific wavelength range linear polarization rotation means (multilayer phase difference filter) 120 as color combination means, dichroic mirrors 40, 41 as color separation means for the two reflection liquid crystal spatial light modulators 101, 102, and a transmission polarization-selective holographic optical element 100 as color separation and condensation means to the one reflection liquid crystal spatial light modulator, as shown in FIG. 9.

In this two-plate projection-type image display device, first, illuminating light emitted from a UHP lamp light source 10 as an illuminating light source becomes incident on an illuminating optical system 20 having functions such as correction of the cross-sectional shape of luminous flux, equalization of intensity, and control of divergence angle.

The illuminating optical system 20 has polarization conversion means 21 called P-S polarization converter having a function of uniformly converting unpolarized luminous fluxes to either P-polarized light or S-polarized light at an efficiency of 50% or higher. This illuminating optical system 20 includes plural condenser lenses and the polarization conversion means 21.

In the image display device shown in FIG. 9, the illuminating light passed through the illuminating optical system 20 has been converted to polarized light with its electrical vector oscillating mainly in a direction perpendicular to the face of FIG. 9, that is, to S-polarized light to the dichroic mirror 40 for blue reflection, the dichroic mirror 41 for green reflection and a mirror 30 on which the light becomes incident after it becomes incident on the illuminating optical system 20.

The illuminating light is reflected by the dichroic mirror 40 for blue reflection and the dichroic mirror 41 for green reflection and becomes incident on the holographic PDLC (transmission polarization-selective holographic optical element) 100 at difference incident angles.

Figure 10:
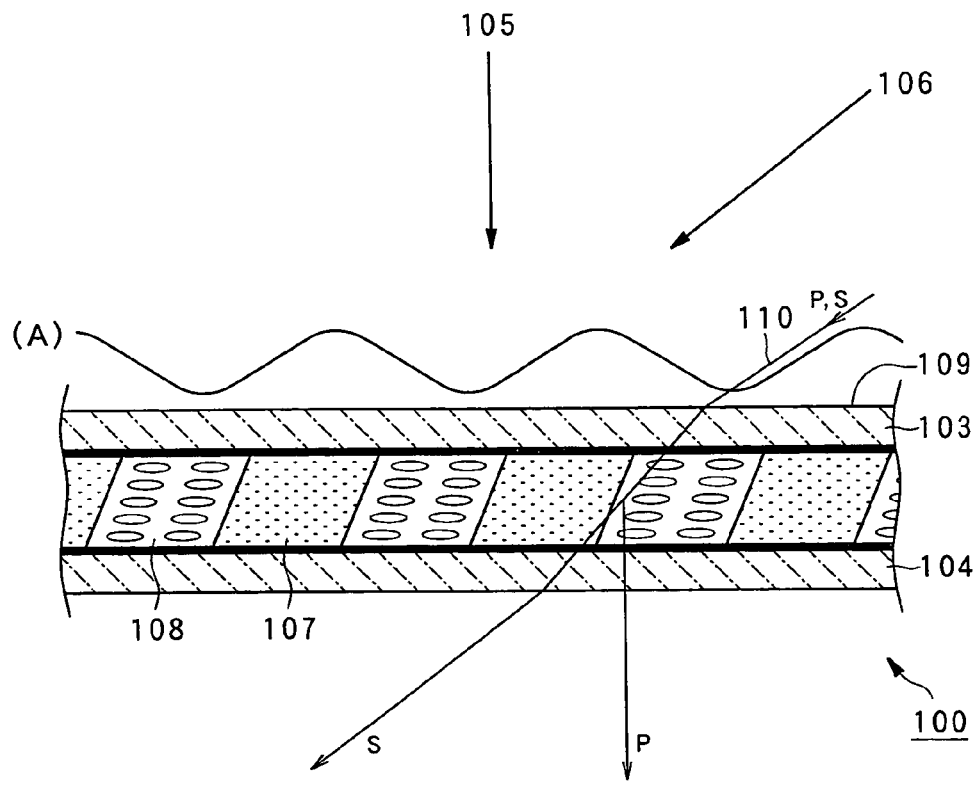
FIG. 10 is a longitudinal sectional view showing the state of manufacturing a holographic optical element used in the image display device.

The holographic PDLC 100 used in this image display device is manufactured by inserting PDLC, which is a mixture of polymer before photopolymerization (hereinafter referred to as prepolymer), nematic liquid crystal, initiator and pigment, between a pair of glass boards 103, 104, as shown in FIG. 10.

In manufacturing this holographic PDLC 100, rate by weight of nematic liquid crystal is approximately 40% of the total weight. For the thickness of this holographic PDLC 100 (hereinafter referred to as cell gap), an optimum value within a range of 3 to 15 μm is selected in accordance with the specifications of the holographic PDLC 100.

Next, to record interference fringes on the holographic PDLC 100, object light 105 and reference light 106 are cast onto the holographic PDLC 100 from a laser light source, not shown, and variation in light intensity (A) is generated by the interference of these lights.

In this case, at a part where the interference fringes are bright, that is, where the photon energy is large, the prepolymer in the holographic PDLC is photopolymerized into polymer by this energy. This polymerized part is sequentially supplied with the prepolymer from the surrounding parts. As a result, an area where the polymerized prepolymer is dense and an area where it is sparse are formed. In the area where the prepolymer is dense, the concentration of nematic liquid crystal is high. In this manner, two areas are formed, that is, a polymer high-density area 107 and a liquid crystal high-density area 108.

This holographic PDLC 100 is of transmission type because it is manufactured by casting the object light 105 and the reference light 106 to the holographic PDLC 100 from the same side.

The polymer high-density area 107 in the holographic PDLC 100 manufactured as described above is isotropic with respect to the refractive index. The refractive index is, for example, 1.5. On the other hand, in the liquid crystal high-density area 108 of the holographic PDCL 100, nematic liquid crystal molecules are arrayed with their longitudinal direction directed substantially perpendicularly to the boundary with the polymer high-density area 107. Therefore, this liquid crystal high-density area 108 is dependent on the direction of incident polarized light. Of reproduced light 110 inclined with respect to a ray incident surface 109 of the holographic PDLC 100 and incident in a direction substantially perpendicular to the direction of the boundary between the polymer high-density area 107 and the liquid crystal high-density area 108, an S-polarized component becomes an ordinary ray in the liquid crystal high-density area 108, as shown in FIG. 10.

If the refractive index nlo of the ordinary ray in the liquid crystal high-density area 108 is set at a value substantially equal to the refractive index np of the polymer high-density area 107, for example, if the difference in the refractive index is less than 0.01, modulation of the incident S-polarized component based on the refractive index is very small and almost no diffraction occurs. Generally, the difference Δn between the refractive index nlo of the ordinary ray of the nematic liquid crystal and the refractive index nle of an extraordinary ray is approximately 0.1 to 0.2. Therefore, even with the reproduced light 111 in the same incident direction, a P-polarized component, which is an extraordinary ray, is different in refractive index between the polymer high-density area 107 and the liquid crystal high-density area 108 and a diffraction effect occurs. For example, the diffraction efficiency for an extraordinary ray can be 50% or more, and the diffraction efficiency for an ordinary ray can be 10% or less.

In this manner, the holographic PDLC 100 functions as a phase modulation hologram with respect to the P-polarized component, which is an extraordinary ray. That is, in this holographic PDLC 100, as shown in FIG. 10, the S-polarized component, which is an ordinary ray, of the reproduced light 111, is transmitted as it is without being diffracted, whereas the P-polarized component, which an extraordinary ray, of the reproduced light 111, is diffracted and emitted substantially perpendicularly from the holographic PDLC 100.

Figure 11:
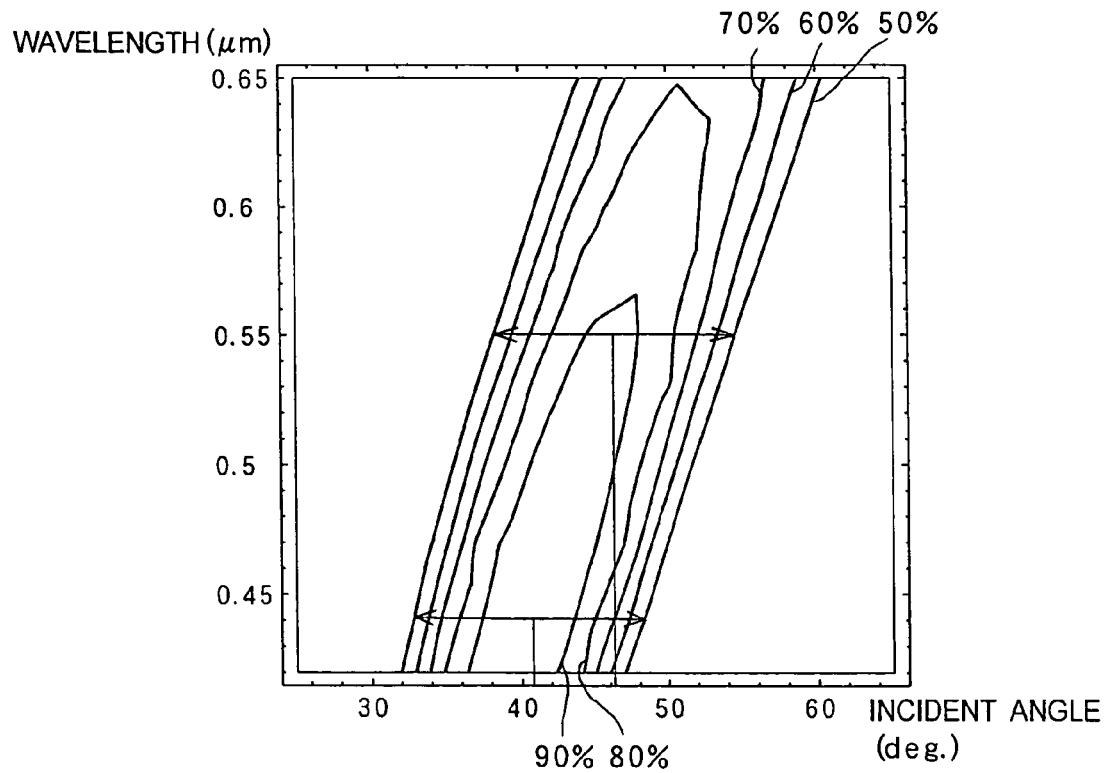
FIG. 11 is a graph showing diffraction efficiency with respect to wavelength and incident angle, of the holographic element used in the image display device.

The diffraction efficiency for P-polarized light of this holographic PDLC 100 depends on the incident angle and wavelength, as shown in FIG. 11. According to this characteristic, a diffraction efficiency of 50% or higher with respect to green light having a center wavelength of 550 nm is realized when the incident angle is 46°±8°, and a diffraction efficiency of 50% or higher with respect to blue light having a center wavelength of 440 nm is realized when the incident angle is 41°±7.5°. In this manner, the incident angle on the holographic PDLC 100 that realizes the optimum diffraction efficiency is different between blue light and green light. Therefore, the angle of illuminating light incident on the holographic PDLC 100 is changed between blue light and green light.

In the above-described holographic PDLC 100, the hologram layer has a thickness of 4 μm, a degree of modulation of refractive index of 0.06, an exposure wavelength of 532 nm, an incident angle of object light of 0° and an incident angle of reference light of 45°.

Figure 12:
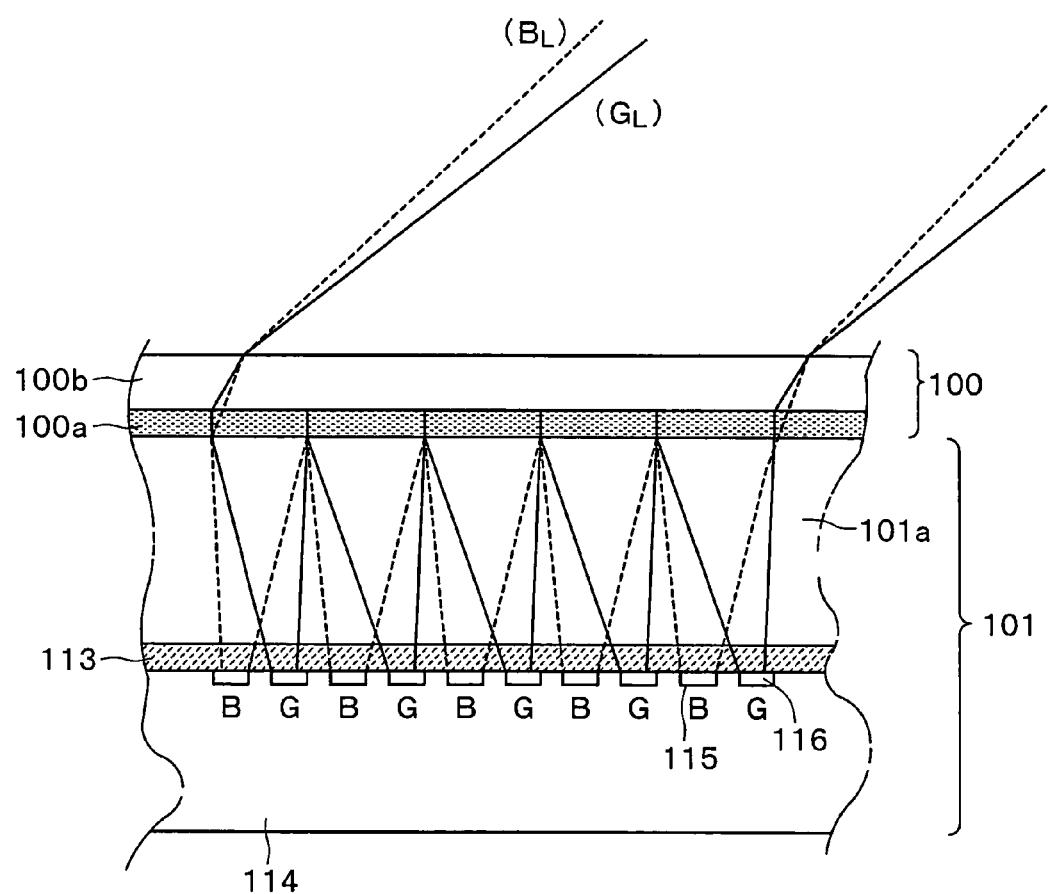
FIG. 12 is a longitudinal sectional view showing the holographic optical element constituting the image display device.

Actually, the holographic PDLC 100 has a single structure made up of a blue/green light hologram layer 100a formed on a glass board 100b and is integrally constituted with the blue/green light reflection liquid crystal spatial light modulator 101, as shown in FIG. 12. The holographic PDLC 100 formed on a glass board 101a has a function of cylindrical lens having condensing capability only in one direction so that illuminating light is condensed on a blue light pixel electrode 115 and a green light pixel electrode 116 of the blue/green light reflection liquid crystal spatial light modulator 101. A liquid crystal layer 123 is formed on the blue light pixel electrode 115 and the green light pixel electrode 116. The blue light pixel electrode 115 and the green light pixel electrode 116 are formed on a glass board 124.

The center of the holographic lens for each color is arranged to be substantially coincident with the center of the corresponding color pixel electrode. Color separation of blue light and green light of the illuminating light is realized by utilizing the difference in the incident angle between blue light ($B_L$) and green light ($G_L$) by approximately 5° and the wavelength distribution of the holographic PDLC 100.

In the case of "white" display, the illuminating light, color-separated and condensed on the respective color pixel electrodes 115, 116, has its direction of incident polarization rotated 90° and is reflected as S-polarized light. Therefore, in this case, the reflected light is emitted substantially perpendicularly to the blue/green light reflection liquid crystal spatial light modulator 101, without being diffracted by the blue light hologram layer and the green light hologram layer.

This reflected light becomes incident on the specific wavelength range linear polarization rotation means (multilayer phase difference filter) 120 such as "Color Select" manufactured by Color Link, as shown in FIG. 9. This specific wavelength range linear polarization rotation means 120 is an optical element formed by stacking phase difference plates and rotates the linear polarization direction of a specific wavelength range only (in this case, blue and green light) by 90°. That is, this specific wavelength range linear polarization rotation means 120 converts the S-polarized light modulated by the blue/green light reflection liquid crystal spatial light modulator 101 to P-polarized light.

The blue and green light thus converted to P-polarized light is transmitted through the polarized light beam splitter 140, then transmitted through red light linear polarization rotation means 121 and a polarizing plate 150 for transmitting P-polarized light, and becomes incident on the projection optical system 70. The polarized light beam splitter 140 is constructed to transmit P-polarized light and reflect S-polarized light. The blue and green light incident on the projection optical system 70 forms an image on a screen, not shown.

Meanwhile, the red light transmitted through the dichroic mirror 40 for blue reflection and the dichroic mirror 41 for green reflection is reflected by the mirror 30, then detected by a polarizing plate 130 for transmitting P-polarized light, and becomes incident on the specific wavelength range linear polarization rotation means 120. This specific wavelength range linear polarization rotation means 120 does not have a polarized light rotation function for red light. Therefore, the red light is transmitted as it is through the specific wavelength range linear polarization rotation means 120. The red light is then transmitted through the polarized light beam splitter 140 and becomes incident on the red light reflection liquid crystal spatial light modulator 102.

Of the modulated light reflected by this red light reflection liquid crystal spatial light modulator 102, S-polarized light corresponding to "white" display is reflected by the polarized light beam splitter 140 and becomes incident on the red light linear polarization rotation means 121. This modulated light has its direction of polarization rotated 90° by the red light linear polarization rotation means 121 and becomes P-polarized light. This modulated light is detected by the polarizing plate 150 and becomes incident on the projection optical system 70. The red light incident on the projection optical system 70 forms an image on the screen, not shown. In this manner, a color image is displayed on the screen.

Figure 13:
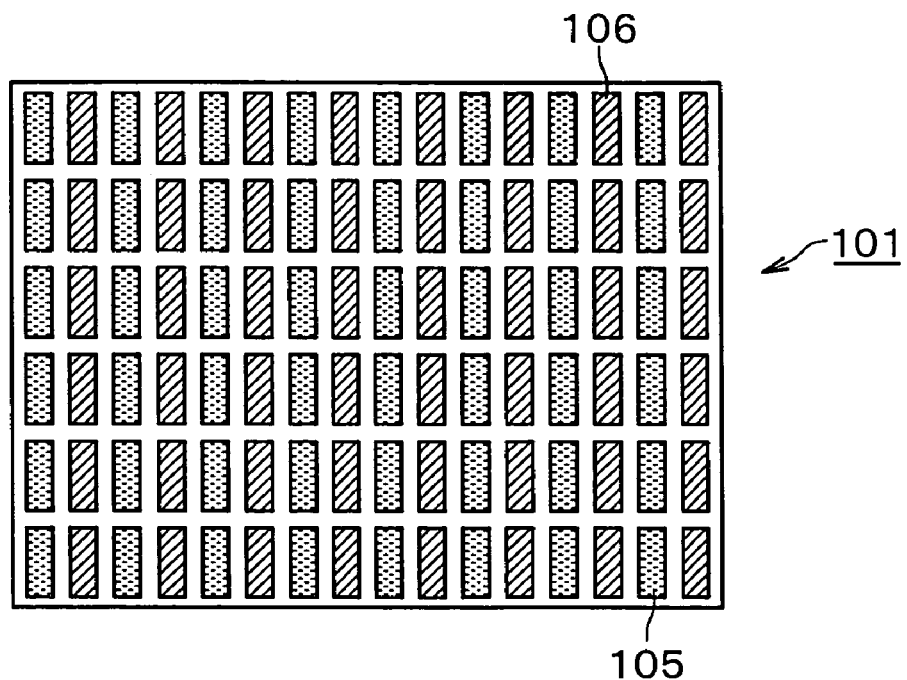
FIG. 13 is a plan view showing the structure of a blue/green spatial light modulator of the image display device.
Figure 14:
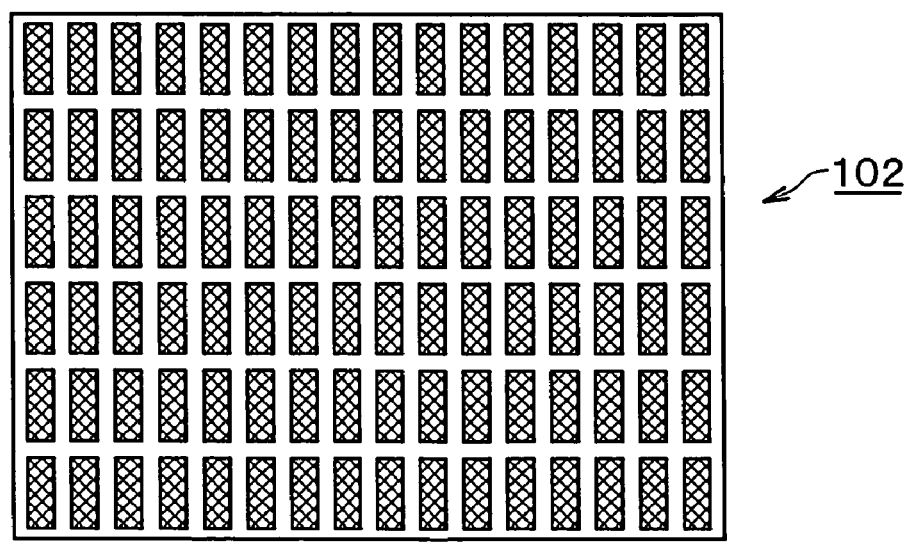
FIG. 14 is a plan view showing the structure of a red spatial light modulator of the image display device.

In this image display device, as shown in FIG. 13, the pixel structure of the blue/green reflection liquid crystal spatial light modulator 101 is perfectly equal to the pixel structure of the red reflection liquid crystal spatial light modulator 102 shown in FIG. 14. In the red reflection liquid crystal spatial light modulator 102, two basic pixels as a pair corresponding to one blue light pixel 125 and one green light pixel 126 are equally driven as one pixel.

The thickness of the liquid crystal layer of the blue/green reflection liquid crystal spatial light modulator 101 and the thickness of the liquid crystal layer of the red reflection liquid crystal spatial light modulator 102 are optimized in accordance with the difference of the color light to be modulated.

Fourth Embodiment

As a fourth embodiment of the image display device according to this invention, an example in which this invention is applied to a two-plate projection-type image display device will be described.

Figure 15:
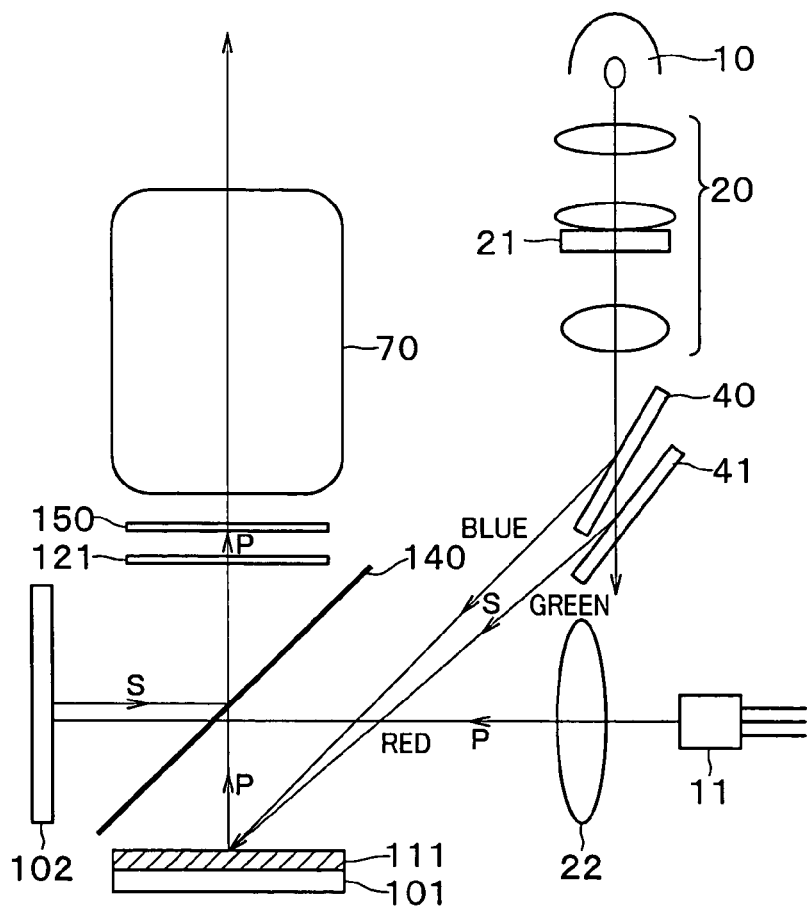
FIG. 15 is a plan view showing a fourth embodiment of the image display device according to this invention.

The two-plate projection-type image display device in the fourth embodiment has reflection liquid crystal spatial light modulators 101, 102 as spatial light modulators, a polarized light beam splitter 140 as color combination means, dichroic mirrors 40, 41 as color separation means to the two reflection liquid crystal spatial light modulators 101, 102, and a holographic PDLC (transmission polarization-selective holographic optical element) 111 as color separation and condensation means to the one reflection liquid crystal spatial light modulator, as shown in FIG. 15.

In this two-plate projection-type image display device, illuminating light emitted from a UHP lamp light source 10 as an illuminating light source becomes incident on an illuminating optical system 20 having functions such as correction of the cross-sectional shape of luminous flux, equalization of intensity, and control of divergence angle.

The illuminating optical system 20 has polarization conversion means 21 called P-S polarization converter having a function of uniformly converting unpolarized luminous fluxes to either P-polarized light or S-polarized light at an efficiency of 50% or higher. This illuminating optical system 20 includes plural condenser lenses and the polarization conversion means 21.

In the image display device shown in FIG. 15, the illuminating light passed through the illuminating optical system 20 has been converted to polarized light with its electrical vector oscillating mainly in a direction parallel to the face of FIG. 15, that is, to P-polarized light to the dichroic mirror 40 for blue reflection and the dichroic mirror 41 for green reflection on which the light becomes incident after it becomes incident on the illuminating optical system 20.

The illuminating light is reflected by the dichroic mirror 40 for blue reflection and the dichroic mirror 41 for green reflection and becomes incident on the holographic PDLC 111 at difference incident angles.

The holographic PDLC 111 used in this image display device is manufactured by inserting PDLC, which is a mixture of polymer before photopolymerization, nematic liquid crystal, initiator and pigment, between a pair of glass boards. The manufacturing method for and the function of the holographic PDLC 111 used in this embodiment are basically similar to those of the holographic PDLC 111 of the third embodiment. However, in this embodiment, the holographic PDLC 11 is constructed to diffract S-polarized light.

Figure 16:
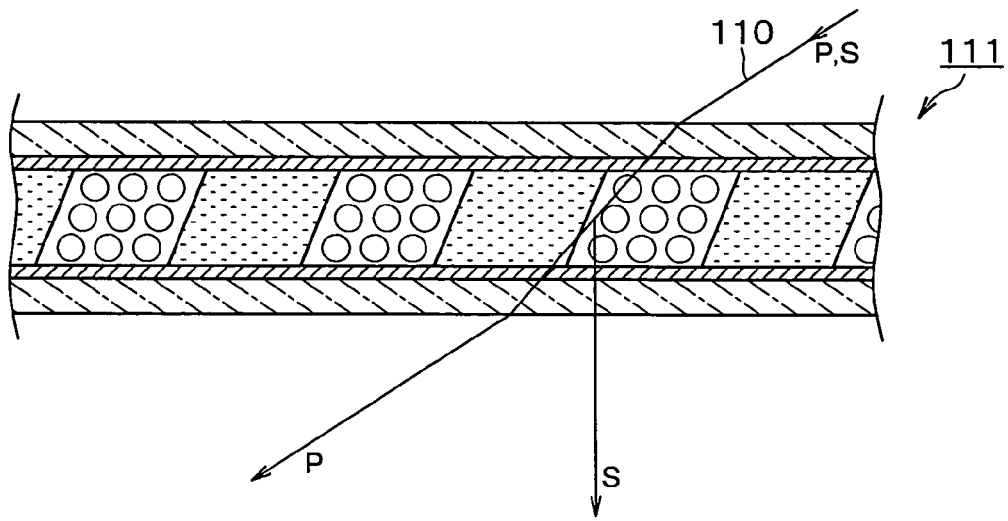
FIG. 16 is a longitudinal sectional view showing a holographic optical element constituting the image display device.

Specifically, the holographic PDLC 111 functions as a phase modulation hologram with respect to an S-polarized component, which is an extraordinary ray. That is, in this holographic PDLC 111, as shown in FIG. 16, a P-polarized component, which is an ordinary ray, of reproduced light 110, is transmitted as it is without being diffracted, whereas an S-polarized component, which an extraordinary ray, of the reproduced light 110, is diffracted and emitted substantially perpendicularly from the holographic PDLC 111.

Figure 17:
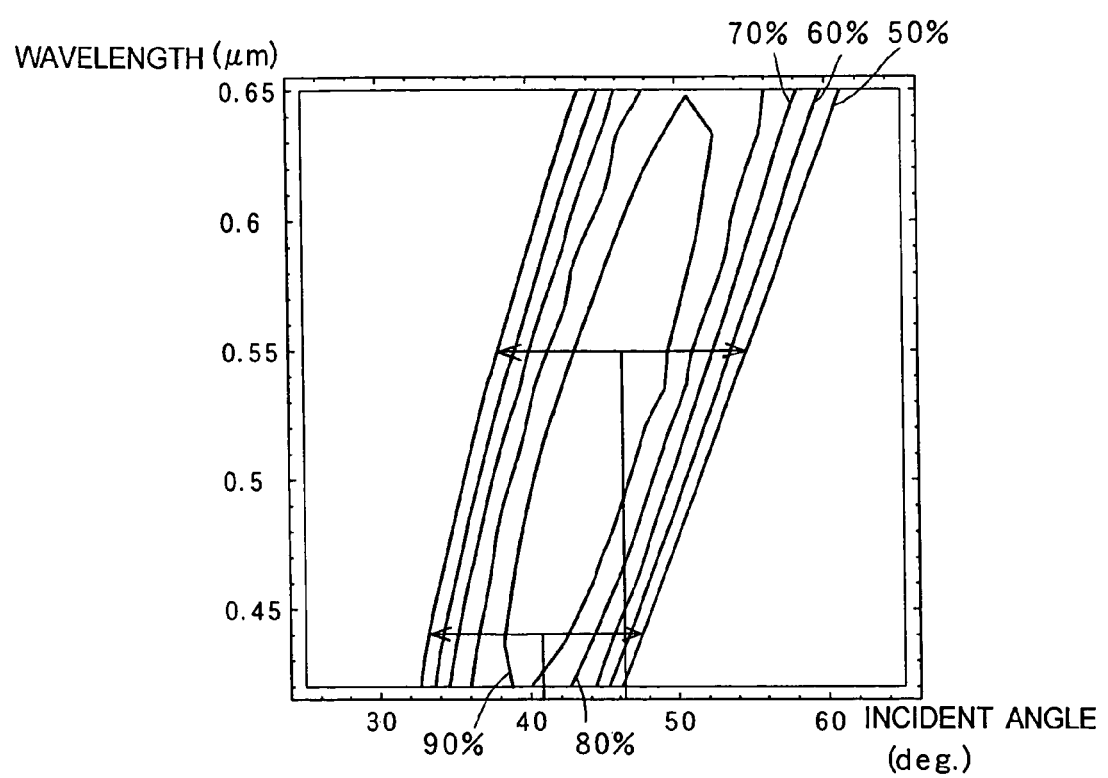
FIG. 17 is a graph showing diffraction efficiency with respect to wavelength and incident angle, of the holographic optical element used in the image display device.

The diffraction efficiency for P-polarized light of this holographic PDLC 111 depends on the incident angle and wavelength, as shown in FIG. 17. According to this characteristic, a diffraction efficiency of 50% or higher with respect to green light having a center wavelength of 550 nm is realized when the incident angle is 46°±8°, and a diffraction efficiency of 50% or higher with respect to blue light having a center wavelength of 440 nm is realized when the incident angle is 41°±7.5°. In this manner, the incident angle on the holographic PDLC 111 that realizes the optimum diffraction efficiency is different between blue light and green light. Therefore, the angle of illuminating light incident on the holographic PDLC 111 is changed between blue light and green light.

In the holographic PDLC 111 used in this embodiment, the hologram layer has a thickness of 4 µm, a degree of modulation of refractive index of 0.06, an exposure wavelength of 532 nm, an incident angle of object light of 0° and an incident angle of reference light of 45°.

Actually, the holographic PDLC 111 used here has a single structure made up of a blue/green light hologram layer and is integrally constituted with the blue/green light reflection liquid crystal spatial light modulator 101, as shown in FIG. 12. The holographic PDLC 111 has a function of cylindrical lens having condensing capability only in one direction so that illuminating light is condensed on a blue light pixel electrode 115 and a green light pixel electrode 116 of the blue/green light reflection liquid crystal spatial light modulator 101.

The center of the holographic lens for each color is arranged to be substantially coincident with the center of the corresponding color pixel electrode. Color separation of blue light and green light of the illuminating light is realized by utilizing the difference in the incident angle between blue light ($B_L$) and green light ($G_L$) by approximately 5° and the wavelength distribution of the holographic PDLC 111.

In the case of "white" display, the illuminating light, color-separated and condensed on the respective color pixel electrodes 115, 116, has its direction of incident polarization rotated 90° and is reflected as S-polarized light. Therefore, in this case, the reflected light is emitted substantially perpendicularly to the blue/green light reflection liquid crystal spatial light modulator 101, without being diffracted by the blue light hologram layer and the green light hologram layer.

This reflected light is transmitted through the polarized light beam splitter 140 for transmitting P-polarized light and reflecting S-polarized light, then transmitted through red light linear polarization rotation means 121 and a polarizing plate 150 for transmitting P-polarized light, and becomes incident on a projection optical system 70. The polarized light beam splitter 140 is constructed to transmit P-polarized light and reflect S-polarized light. The blue and green light incident on the projection optical system 70 forms an image on a screen, not shown.

Meanwhile, red light emitted from a red LED light source 11 provided separately from the UHP lamp light source 10 is passed through a condenser lens 22, the transmitted through the polarized light beam splitter 140, and becomes incident on the red light reflection liquid crystal spatial light modulator 102. Of the modulated light reflected by this red light reflection liquid crystal spatial light modulator 102, S-polarized light corresponding to "white" display is reflected by the polarized light beam splitter 140, then has its direction of polarization rotated 90° by the red light linear polarization rotation means 121, and becomes P-polarized light. This modulated light is detected by the polarizing plate 150 and becomes incident on the projection optical system 70. The red light incident on the projection optical system 70 forms an image on the screen, not shown. In this manner, a color image is displayed on the screen.

In this image display device, as shown in FIG. 13, the pixel structure of the blue/green reflection liquid crystal spatial light modulator 101 is perfectly equal to the pixel structure of the red reflection liquid crystal spatial light modulator 102 shown in FIG. 14. In the red reflection liquid crystal spatial light modulator 102, two basic pixels as a pair corresponding to one blue light pixel 125 and one green light pixel 126 are equally driven as one pixel.

The thickness of the liquid crystal layer of the blue/green reflection liquid crystal spatial light modulator 101 and the thickness of the liquid crystal layer of the red reflection liquid crystal spatial light modulator 102 are optimized in accordance with the difference of the color light to be modulated.

Fifth Embodiment

As a fifth embodiment of the image display device according to this invention, an example in which this invention is applied to a two-plate projection-type image display device will be described.

Figure 18:
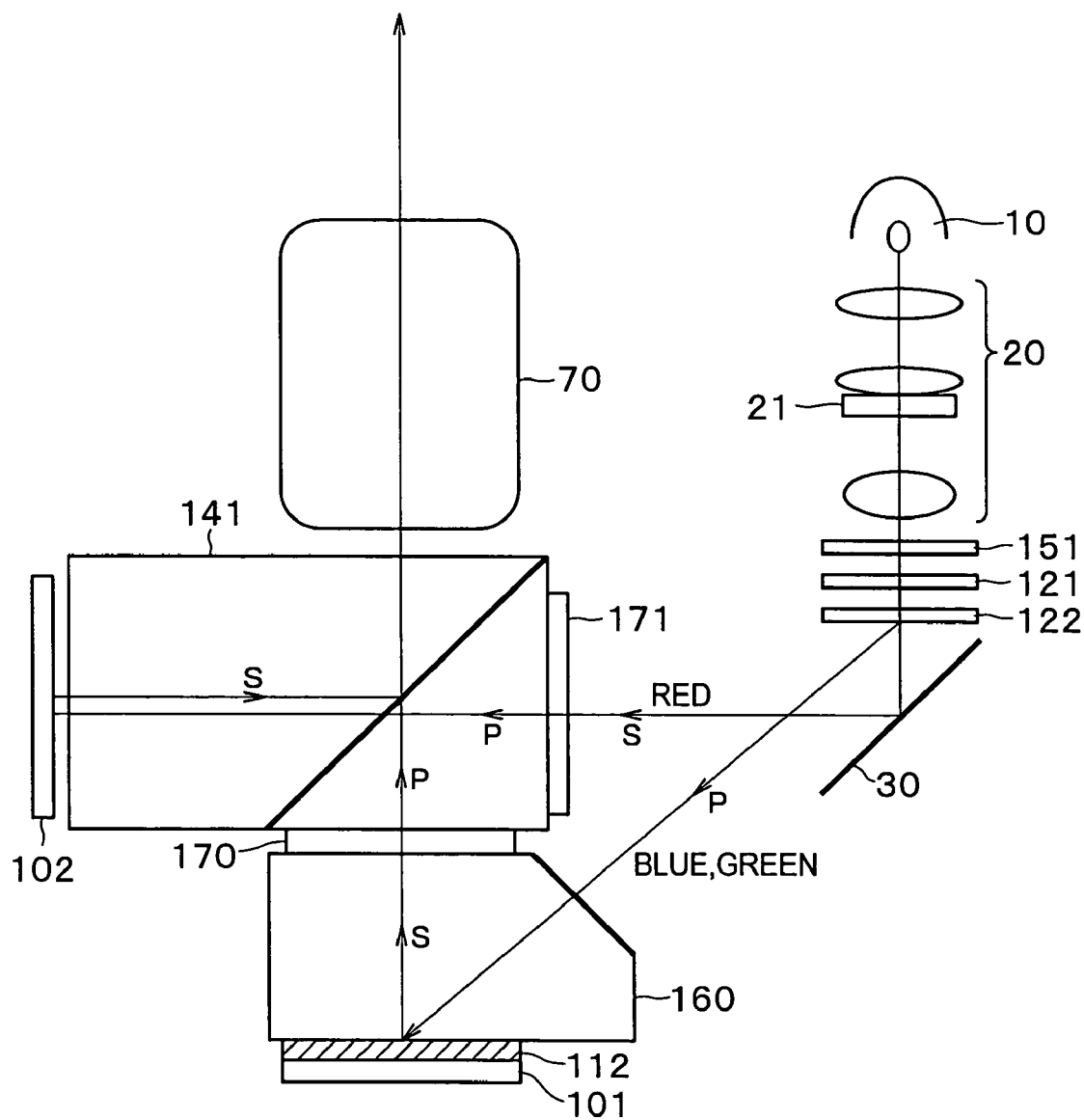
FIG. 18 is a plan view showing a fifth embodiment of the image display device according to this invention.

The two-plate projection-type image display device in the fifth embodiment has reflection liquid crystal spatial light modulators 101, 102 as spatial light modulators, a polarized light beam splitter 141 as color combination means, a holographic PDLC 122 as color separation means to the two reflection liquid crystal spatial light modulators 101, 102, and a holographic PDLC 112 as color separation and condensation means to the one reflection liquid crystal spatial light modulator 101, as shown in FIG. 18.

First, illuminating light emitted from a UHP lamp light source 10 as an illuminating light source becomes incident on an illuminating optical system 20 having functions such as correction of the cross-sectional shape of luminous flux, equalization of intensity, and control of divergence angle.

The illuminating optical system 20 has polarization conversion means 21 called P-S polarization converter having a function of uniformly converting unpolarized luminous fluxes to either P-polarized light or S-polarized light at an efficiency of 50% or higher. This illuminating optical system 20 includes plural condenser lenses and the polarization conversion means 21.

In this embodiment, the illuminating light passed through the illuminating optical system 20 has been converted to polarized light with its electrical vector oscillating mainly in a direction parallel to the face of FIG. 18, that is, to P-polarized light to a mirror 30 on which the light becomes incident after it becomes incident on the illuminating optical system 20.

The illuminating light is detected by a polarizing plate 151 for transmitting P-polarized light, then only has its red light component converted to S-polarized light by red light linear polarization rotation means (multilayer phase difference filter) 121, and becomes incident on the holographic PDLC (transmission polarization-selective holographic optical element) 122. This holographic PDLC 122 diffracts only P-polarized light and transmits S-polarized light, like the holographic PDLC 100 of the above-described third embodiment. Therefore, blue and green light is diffracted by this holographic PDLC 122 and red light is transmitted through the holographic PDLC 122 as it is.

The blue and green light diffracted by the holographic PDLC 122 passes through a place of incidence of a coupling prism 160 and becomes incident on the holographic PDLC 112 optically joined with the coupling prism 160. Also this holographic PDCL 112 has a function of diffracting only P-polarized light and transmitting S-polarized light, like the holographic PDCL 100 of the above-described third embodiment.

Figure 19:
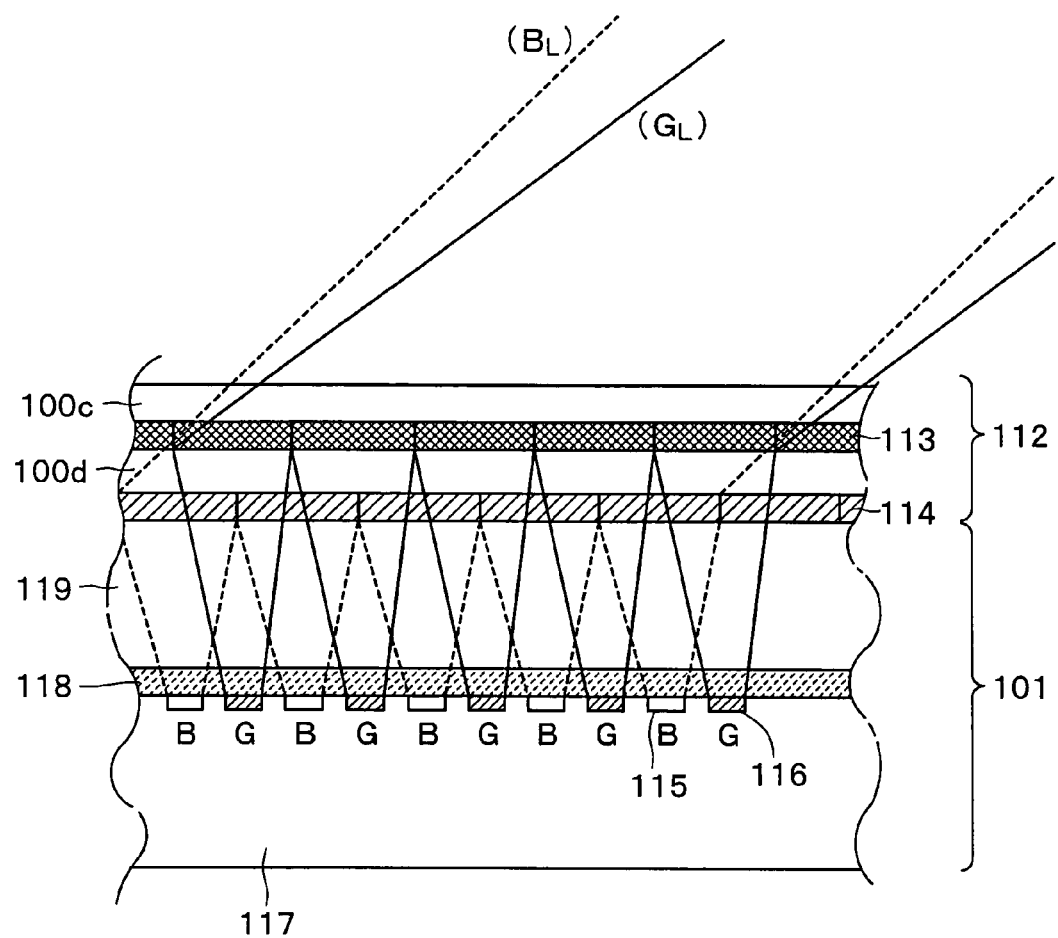
FIG. 19 is a longitudinal sectional view showing a holographic optical element constituting the image display device.

The holographic PDLC 112 of this embodiment has a stacked two-layer structure in which a blue light hologram layer 113 and a green light hologram layer 114 are provided as two layers with glass boards 100c, 100d, and the holographic PDLC 112 is integrally constructed with the blue/green light reflection liquid crystal spatial light modulator 101, as shown in FIG. 19. The holographic PDLC 112 has a function of cylindrical lens having condensing capability only in one direction so that illuminating light is condensed on a blue light pixel electrode 115 and a green light pixel electrode 116 of the blue/green light reflection liquid crystal spatial light modulator 101. The center of the holographic lens for each color is arranged to be substantially coincident with the center of the corresponding color pixel electrode.

The blue light pixel electrode 115 and the green light pixel electrode 116 are formed on a glass board 127. A liquid crystal layer 128 is formed on the electrodes 115, 116. Moreover, a glass board 129 is provided thereon.

In the case of "white" display, the illuminating light, color-separated and condensed on the respective color pixel electrodes 115, 116, has its direction of incident polarization rotated 90° and is reflected as S-polarized light. Therefore, in this case, the reflected light is emitted substantially perpendicularly to the blue/green light reflection liquid crystal spatial light modulator 101, without being diffracted by the blue light hologram layer 113 and the green light hologram layer 114.

The modulated light, which is S-polarized light reflected by the blue/green light reflection liquid crystal spatial light modulator 101, passes through the coupling prism 160 again and has its direction of polarization rotated by 90° by a ½ wavelength plate 170 to become P-polarized light, as shown in FIG. 18. Then, this modulated light is transmitted through the polarized light beam splitter 141 for transmitting P-polarized light and reflecting S-polarized light and becomes incident on a projection optical system 70. The blue and green light incident on the projection optical system 70 forms an image on a screen, not shown.

Meanwhile, the red light, which is S-polarized light transmitted through the holographic PDLC 122, is reflected by the mirror 30, then converted to P-polarized light by the ½ wavelength plate 170, and becomes incident on the polarized light beam splitter 141. Then, the red light is transmitted through a polarized light separation film of this polarized light beam splitter 141 and becomes incident on the red light reflection liquid crystal spatial light modulator 102. Of the modulated light reflected by the red light reflection liquid crystal spatial light modulator 102, S-polarized light corresponding to "white" display is reflected by the polarized light separation film of the polarized light beam splitter 141 and combined with the blue and green light. This modulated light becomes incident on the projection optical system 70. The red light incident on the projection optical system 70 forms an image on the screen, not shown. In this manner, a color image is displayed on the screen.

In this image display device, as shown in FIG. 13, the pixel structure of the blue/green reflection liquid crystal spatial light modulator 101 is perfectly equal to the pixel structure of the red reflection liquid crystal spatial light modulator 102 shown in FIG. 14. In the red reflection liquid crystal spatial light modulator 102, two basic pixels as a pair corresponding to one blue light pixel 125 and one green light pixel 126 are equally driven as one pixel.

The thickness of the liquid crystal layer of the blue/green reflection liquid crystal spatial light modulator 101 and the thickness of the liquid crystal layer of the red reflection liquid crystal spatial light modulator 102 are optimized in accordance with the difference of the color light to be modulated.

Sixth Embodiment

As a sixth embodiment of the image display device according to this invention, an example in which this invention is applied to a single-plate projection-type image display device will be described.

Figure 20:
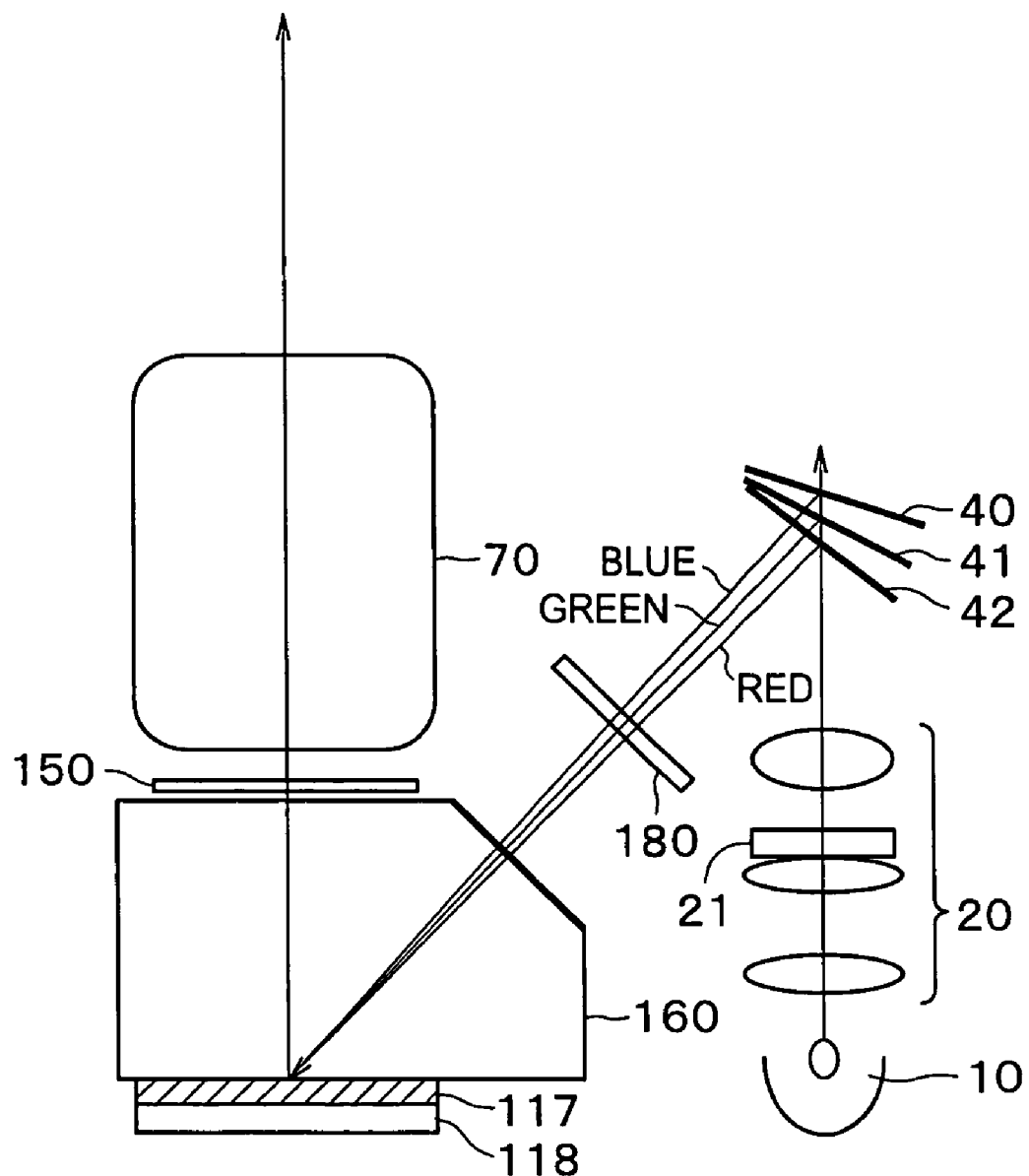
FIG. 20 is a plan view showing a sixth embodiment of the image display device according to this invention.

The single-plate projection-type image display device in the sixth embodiment has a holographic PDLC (transmission polarization-selective holographic optical element) 117 as color separation and condensation means to a reflection liquid crystal spatial light modulator 118, as shown in FIG. 20.

In this image display device, illuminating light emitted from a UHP lamp light source 10 as an illuminating light source becomes incident on an illuminating optical system 20 having functions such as correction of the cross-sectional shape of luminous flux, equalization of intensity, and control of divergence angle.

The illuminating optical system 20 has polarization conversion means 21 called P-S polarization converter having a function of uniformly converting unpolarized luminous fluxes to either P-polarized light or S-polarized light at an efficiency of 50% or higher. This illuminating optical system 20 includes plural condenser lenses and the polarization conversion means 21.

In this image display device, the illuminating light passed through the illuminating optical system 20 has been converted to polarized light with its electrical vector oscillating mainly in a direction parallel to the face of FIG. 20, that is, to P-polarized light to dichroic mirrors 43, 41 and 40 on which the light becomes incident after it becomes incident on the illuminating optical system 20.

As this illuminating light sequentially passes through the dichroic mirror 43 for red reflection, the dichroic mirror 41 for green reflection and the dichroic mirror 40 for blue reflection, its red component, green component and blue component are reflected. These red component, green component and blue component of the illuminating light become incident on a color wheel 180. This color wheel 180 time-divisionally switches red light and cyan (blue+green) light. The color light components passed through the color wheel 180 become incident on the holographic PDLC 117 at different incident angles, respectively.

The structure of the holographic PDLC 117 used in this embodiment is adapted for diffracting P-polarized light and not diffracting S-polarized light, like the holographic PDLC 100 used in the above-described third embodiment. This holographic PDLC 117 has a structure in which hologram layers for R, G, B light 131, 132, 133 are stacked as three layers with glass board 134, 135, 136, and the holographic PDLC 117 is integrally constructed with the reflection liquid crystal spatial light modulator 118, as shown in FIGS. 21 and 22.

The holographic PDLC 117 has a function of cylindrical lens having condensing capability only in one direction so that illuminating light is condensed on a corresponding basic pixel of each color of the reflection liquid crystal spatial light modulator 118.

Figure 21:
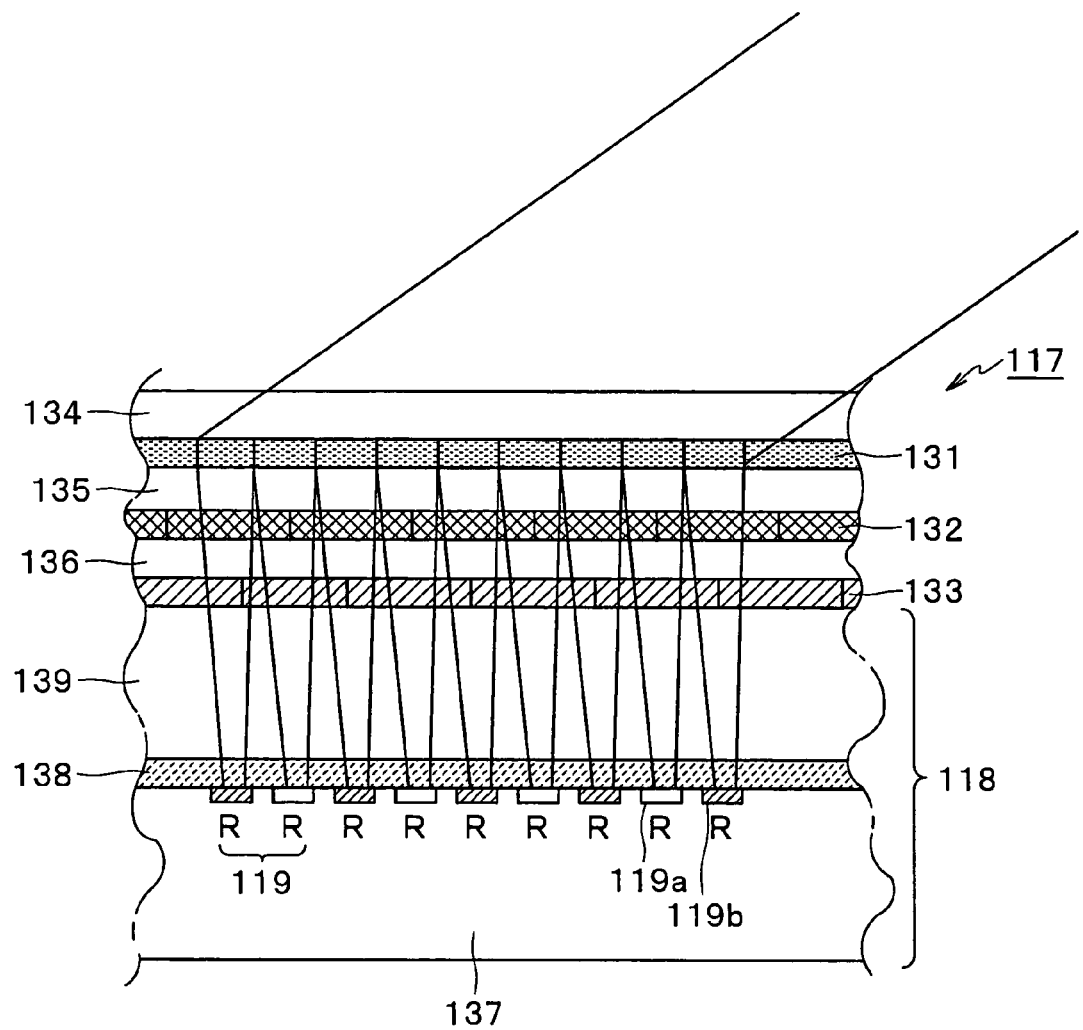
FIG. 21 is a longitudinal sectional view showing a holographic optical element constituting the image display device in the case of red illumination.
Figure 22:
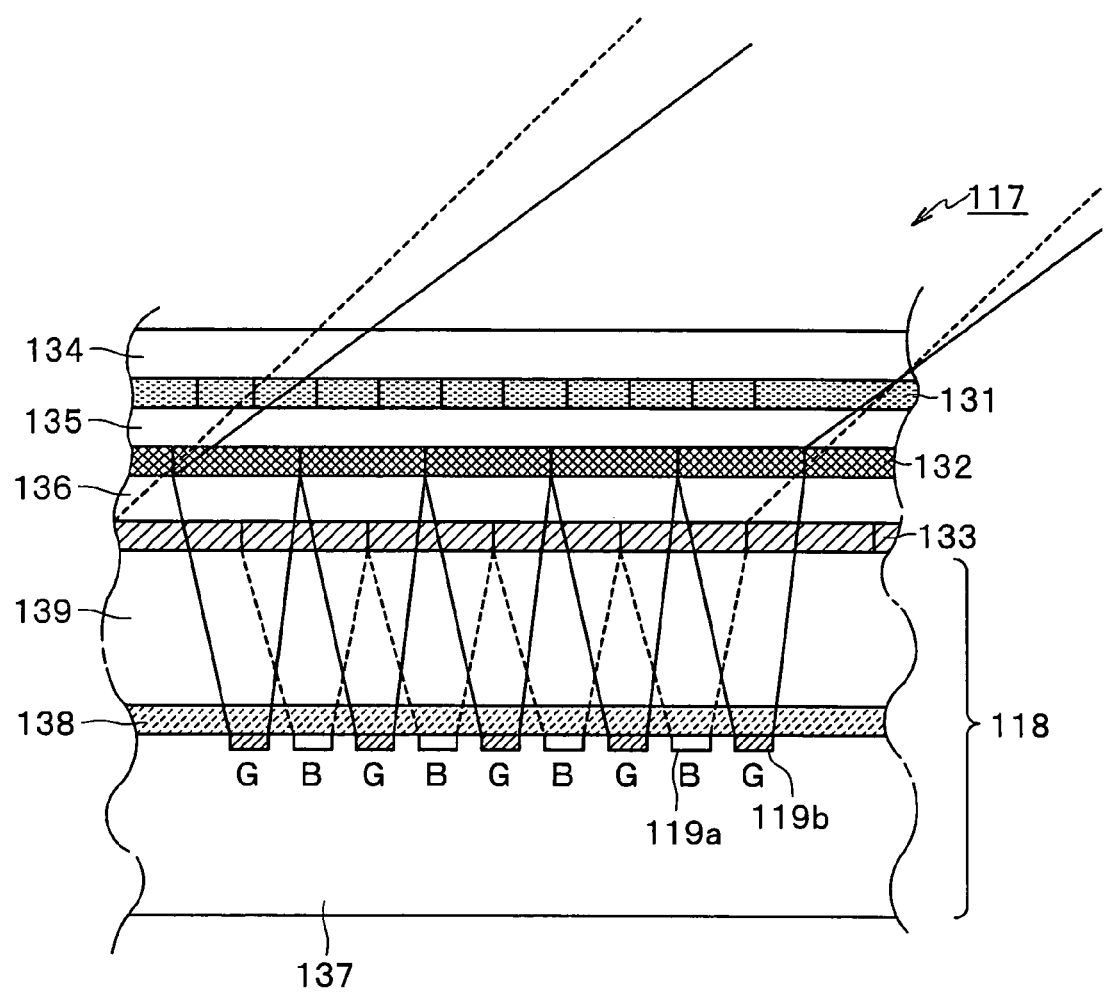
FIG. 22 is a longitudinal sectional view showing the holographic optical element constituting the image display device in the case of blue/green illumination.

In the case where the red light component of the illuminating light is selected by the color wheel 180 and made incident on the holographic PDLC 117, the illuminating light is diffracted only by the red light hologram layer 131 of the holographic PDCL 117 and condensed on all basic pixel electrodes 119a, 119b of the reflection liquid crystal spatial light modulator 118, as shown in FIG. 21. In image display, since two adjacent basic pixel electrodes 119a, 119b are used as one pixel electrode 119, these adjacent two pixel electrodes 119a, 119b are equally driven as one pixel electrode 119.

Also in the reflection liquid crystal spatial light modulator 118, the pixel electrodes 119 are formed on a glass board 137. A liquid crystal layer 138 is provided on the pixel electrodes 119. The holographic PDLC 117 is provided over this with a glass board 139 provided between the holographic PDLC 117 and the liquid crystal layer 138.

Next, in the case where the blue light component and the green light component of the illuminating light are selected by the color wheel 180 and made incident on the holographic PDLC 117, these color components of the illuminating light are diffracted by the blue light hologram layer 133 and the green light hologram layer 132, respectively, and condensed on the corresponding basic pixel electrodes 119a, 119b of the holographic PDLC 117, as shown in FIG. 22.

In this reflection liquid crystal spatial light modulator 118, the two basic pixel electrodes for red light modulation as a pair in red light modulation, and the basic pixel electrode for blue light modulation and the basic pixel electrode for green light modulation in blue and green light modulation, that is, four pixel electrodes in total, are driven as one pixel to realize color image display. Of these four pixel electrodes in total, the two basic pixel electrodes for red light modulation will be later used as the basic pixel electrode for blue light modulation and the basic pixel electrode for green light modulation. Therefore, it can be considered that there are physically two pixel electrodes.

In the holographic PDLC 117, since the hologram layers 131 to 133 are stacked, the diffracted light diffracted by the red hologram layer 131 and the green hologram layer 132, which are upper layers, is diffracted again by the blue hologram layer 133, which is a lower layer. Therefore, a part of the illuminating light does not illuminate the reflection liquid crystal spatial light modulator 118.

To prevent this, it is necessary to sufficiently narrow the spreading angle of the illuminating light to be cast, for example, to approximately ±3°, and narrow the wavelength range of each color light, for example, to approximately ±20 nm. Moreover, it is necessary to reduce the allowable diffraction angle of each hologram layer. Therefore, in this embodiment, the illuminating light is set to be incident on the hologram layers at a sufficiently large angle, for example, 65°, using a coupling prism 160.

In the case of "white" display, the illuminating light, color-separated and condensed on the respective color pixel electrodes 119a, 119b of the reflection liquid crystal spatial light modulator 118, has its direction of incident polarization rotated 90° and is reflected as S-polarized light. Therefore, in this case, the reflected light is emitted substantially perpendicularly to the reflection liquid crystal spatial light modulator 118, without being diffracted by the respective color light hologram layers (R, G, B).

This reflected light passes through the coupling prism 160 again, then detected by a polarizing plate 150 for transmitting S-polarized light, and becomes incident on a projection optical system 70, as shown in FIG. 20. The reflected light incident on the projection optical system 70 forms an image on a screen, not shown. In this manner, a color image is displayed on the screen.

Seventh Embodiment

As a seventh embodiment of the image display device according to this invention, an example in which this invention is applied to a virtual image display device will be described.

Figure 23:
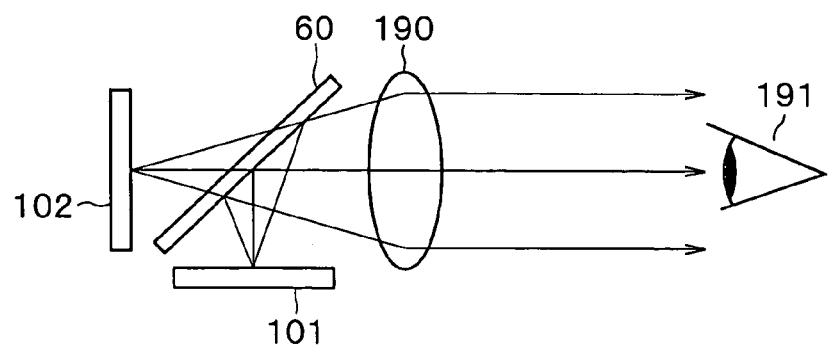
FIG. 23 is a side view showing a seventh embodiment of he image display device according to this invention.

The virtual image display device has EL image display elements 101, 102 as two spatial light modulators, a dichroic mirror 60, and an eyepiece lens 190, as shown in FIG. 23.

In this image display device, display light from the EL image display element 101 for red light emission and display light from the EL image display element 102 for green/blue light emission are combined by the dichroic mirror 60 for red reflection, then passes through the eyepiece lens 190, and makes virtual image display to an eye 191.

In this image display device, as shown in FIG. 3, the EL display element 102 for blue/green light emission has a pixel structure such that the basic pixel pitch in the direction of arrow X is ½ of the basic pixel pitch in the pixel structure of the EL display element 101 for red light emission shown in FIG. 4 and each pixel area is approximately half the pixel area in the pixel structure of the EL display element 101 for red light emission.

INDUSTRIAL APPLICABILITY

As described above, the image display device according to this invention realizes color image display by using one or two spatial light modulators. Therefore, the number of spatial light modulators to be used can be reduced and the device itself can be miniaturized. Moreover, the positions of the spatial light modulators can be easily adjusted and accurate positional alignment of the spatial light modulators can be easily realized.

Moreover, the image display device according to this invention can avoid increase in F-number of a projection optical system due to increase of back focusing to the projection optical system required in the case of a projection-type image display device, and therefore enables reduction in the manufacturing cost.

In the image display device according to this invention, even when a spatial light modulator with a relatively low response speed is used, since the spatial light modulator has a two-plate structure, the definition of a displayed image is not significantly lowered and color image display having no color breakup with high light utilization efficiency can be realized.

In the image display device according to this invention, if a spatial light modulator that has a relatively high response speed and can realize two-color switching display at a level where color breakup does not occur is used, color image display with high light utilization efficiency can be realized by a single-plate structure.

In the image display device according to this invention, by separating and condensing color light corresponding to two basic color pixels physically formed in one spatial light modulator onto the two basic color pixels, it is possible to realize a highly efficient image display element.

Moreover, by using a polarization-selective holographic optical element using an anisotropic material such as a liquid crystal material as a holographic optical element, it is possible to realize more efficient color image display.

In the image display device according to this invention, when two spatial light modulators are used, by using the spatial light modulator having a color pixel for modulating one wavelength range as a spatial light modulator for red light modulation and using the spatial light modulator having a color pixel for modulating two different wavelength ranges as a spatial light modulator for blue and green light modulation, it is possible to realize highly efficient color image display with good color balance.

When one spatial light modulator is used, by using light beams of two colors emitted from a time division color filter as red light and cyan light and illuminating the spatial light modulator with these lights, it is possible to realize highly efficient color image display with good color balance.

In the image display device according to this invention, when two spatial light modulators are used, by using a second light source that mainly emits red light and illuminating the spatial light modulator having a color pixel for modulating one wavelength range with the second light source, it is possible to realize highly efficient color image display with good color balance.

The invention claimed is:

1. An image display device comprising:
    an illuminating light source for emitting illuminating light;
    a first spatial light modulator on which a first wavelength range component of the illuminating light becomes incident and which modulates the first wavelength range component in accordance with a pixel corresponding to the first wavelength range component;
    color separation and condensation means being a holographic optical element for separating second and third wavelength range components different from the first wavelength range component of the illuminating light and condensing the respective wavelength range components;
    a second spatial light modulator on which the second and third wavelength range components are condensed and made incident at different pixel positions corresponding to the second and third wavelength range components by the color separation and condensation means and which modulates these respective wavelength range components in accordance with pixels corresponding to the respective wavelength range components; and
    color combination means for combining modulated light emitted from the first and second spatial light modulators.

2. The image display device as claimed in claim 1, wherein the holographic optical element is a polarization-selective holographic optical element containing a liquid crystal material.

3. The image display device as claimed in claim 1, wherein illuminating light incident on the holographic optical element is P-polarized light.

4. The image display device as claimed in claim 1, wherein the holographic optical element has a diffraction efficiency of 50% or more for P-polarized light and a diffraction efficiency of 10% or less for S-polarized light.

5. The image display device as claimed in claim 1, wherein in the holographic optical element, two types of holographic lenses, that is, a holographic lens for green diffraction and a holographic lens for blue diffraction, are formed by stacking plural hologram layers or by multiple exposure of one hologram layer.

6. The image display device as claimed in claim 1, further comprising color separation means made up of a holographic optical element on which the illuminating light from the illuminating light source becomes incident,
    wherein the color separation means diffracts one of blue and green light, which is the second and third wavelength range components of the illuminating light, and red light, which is the first wavelength range component of the illuminating light, and does not diffract the other, thereby separating the blue and green light from the red light, and the color separation means causes the red light to be incident on the first spatial light modulator and causes the blue and green light to be incident on the holographic optical element which is the color separation and condensation means.

7. The image display device as claimed in claim 1, wherein the second spatial light modulator has, in different pixels corresponding to the second and third wavelength range components, a color filter corresponding to each wavelength range.

8. The image display device as claimed in claim 7, wherein the first and second spatial light modulators are reflection spatial light modulators,
    optical element is a polarization-selective holographic optical element containing a liquid crystal material.

9. The image display device as claimed in claim 7, wherein the color combination means is a color combination mirror having a dielectric multilayer film.

10. The image display device as claimed in claim 7, wherein the color combination means is a polarized light beam splitter.

11. The image display device as claimed in claim 7, wherein the color combination means is a holographic optical element.

12. The image display device as claimed in claim 7, wherein the pixel in the first spatial light modulator is a pixel for a red light modulation, and the pixels of the second spatial light modulator are a pixel for blue light modulation and a pixel for green light modulation.

13. The image display device as claimed in claim 7, wherein the illuminating light source includes plural light sources having difference emission wavelength ranges and illuminating light emitted from at least one light source illuminates only one of the first and second spatial light modulators.

14. The image display device as claimed in claim 7, further comprising color separation means for separating the illuminating light into the first wavelength range component and a range component including the second and third wavelength range components, causing the first wavelength range component to be incident on the first spatial light modulator, and causing the range component including the second and third wavelength range components to be incident on the color separation and condensation means.

15. The image display device as claimed in claim 7, wherein the first and second spatial light modulators have equal pixel structures and display areas.

16. The image display device as claimed in claim 7, wherein the number of pixels in the first spatial light modulator is ½ of the number of pixels in the second spatial light modulator and its display area is equal to that of the second spatial light modulator.

17. An image display device comprising:
- an illuminating light source for emitting illuminating light;
- a time division color filter on which the illuminating light becomes incident and which sequentially and alternately transmits two different wavelength range components of the illuminating light;
- color separation and condensation means for condensing one wavelength range component transmitted through the time division color filter as a first wavelength range component, and for separating the other wavelength range component transmitted through the time division color filter into second and third wavelength range components and condensing the respective wavelength range components; and
- spatial light modulators for modulating the first wavelength range component in accordance with a pixel corresponding to the first wavelength range component when the first wavelength range component is made incident thereon by the color separation and condensation means, and for modulating the second and third wavelength range components in accordance with pixels corresponding to these respective wavelength range components when these respective wavelength range components are condensed and made incident at different pixel positions corresponding to the second and third wavelength range components.

18. The image display device as claimed in claim 17, wherein two wavelength range components transmitted by the time division color filter are red light and cyan light.

19. The image display device as claimed in claim 17, wherein the spatial light modulator is a reflection spatial light modulator.

20. The image display device as claimed in claim 17, wherein the illuminating light source includes plural illuminating light sources having difference emission wavelength ranges and illuminating light emitted from at least one illuminating light source illuminates only one of the spatial light modulators.

21. The image display device as claimed in claim 17, further comprising color separation means for separating the different wavelength range components of the illuminating light to the first spatial light modulator and the second spatial light modulator.

22. The image display device as claimed in claim 17, wherein the color separation and condensation means is a holographic optical element.

23. The image display device as claimed in claim 22, wherein the holographic optical element is a polarization-selective holographic optical element containing a liquid crystal material.

24. The image display device as claimed in claim 22, wherein illuminating light incident on the holographic optical element is P-polarized light.

25. The image display device as claimed in claim 22, wherein the holographic optical element has a diffraction efficiency of 50% or more for P-polarized light and a diffraction efficiency of 10% or less for S-polarized light.

26. The image display device as claimed in claim 22, wherein in the holographic optical element, three types of holographic lenses, that is, a holographic lens for red diffraction, a holographic lens for green diffraction and a holographic lens for blue diffraction, are formed by stacking plural hologram layers or by multiple exposure of one hologram layer.

27. The image display device as claimed in claim 26, wherein the area of one said holographic lens for red diffraction is ½ of the area of one said holographic lens for green diffraction and said holographic lens for blue diffraction.

* * * * *